(12) United States Patent
Blomqvist et al.

(10) Patent No.: US 11,060,866 B2
(45) Date of Patent: Jul. 13, 2021

(54) BALANCED MULTIAXIS GYROSCOPE

(71) Applicant: MURATA MANUFACTURING CO., LTD., Nagaokakyo (JP)

(72) Inventors: Anssi Blomqvist, Helsinki (FI); Ville-Pekka Rytkönen, Klaukkala (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 2 days.

(21) Appl. No.: 16/747,659

(22) Filed: Jan. 21, 2020

(65) Prior Publication Data

US 2020/0263987 A1 Aug. 20, 2020

(30) Foreign Application Priority Data

Feb. 15, 2019 (FI) ...................................... 20195117

(51) Int. Cl.
*G01C 19/5712* (2012.01)
*G01C 19/574* (2012.01)

(52) U.S. Cl.
CPC ....... *G01C 19/5712* (2013.01); *G01C 19/574* (2013.01)

(58) Field of Classification Search
CPC .......................... G01C 19/5712; G01C 19/574
See application file for complete search history.

(56) References Cited

U.S. PATENT DOCUMENTS

| 5,635,640 | A | * | 6/1997 | Geen | G01C 19/5712 |
| | | | | | 310/309 |
| 6,742,389 | B2 | * | 6/2004 | Nguyen | G01C 19/5719 |
| | | | | | 73/504.12 |
| 7,421,897 | B2 | * | 9/2008 | Geen | G01C 19/574 |
| | | | | | 73/504.12 |

(Continued)

FOREIGN PATENT DOCUMENTS

| CN | 108020220 A | 5/2018 |
| DE | 10 2008 002748 A1 | 12/2009 |
| DE | 10 2010 000811 A1 | 7/2011 |

OTHER PUBLICATIONS

Finnish Search Report dated Sep. 17, 2019 corresponding to Finnish Patent Application No. 20195117.

(Continued)

*Primary Examiner* — David J Bolduc
(74) *Attorney, Agent, or Firm* — Squire Patton Boggs (US) LLP

(57) ABSTRACT

A microelectromechanical gyroscope comprises a first proof mass quartet centred around a first quartet center point and a second proof mass quartet centred around a second quartet center point. The gyroscope comprises a suspension arrangement configured to accommodate the primary and secondary oscillating motion of the first and second proof mass quartets. The suspension arrangement comprises a first synchronization frame and a second synchronization frame. Each synchronization frame surrounds the corresponding proof mass quartet, and each proof mass is coupled to the (Continued)

surrounding synchronization frame with one or more frame suspension springs. The gyroscope also comprises a lateral synchronization spring which extends from the first proof mass quartet to the second proof mass quartet.

8 Claims, 22 Drawing Sheets

(56) References Cited

U.S. PATENT DOCUMENTS

| | | | | |
|---|---|---|---|---|
| 8,844,357 B2* | 9/2014 | Scheben | ............ | G01C 19/5747 73/504.12 |
| 10,371,521 B2* | 8/2019 | Johnson | ............ | G01C 19/5656 |
| 2004/0211257 A1* | 10/2004 | Geen | ............ | G01P 15/14 73/504.04 |
| 2005/0081633 A1* | 4/2005 | Nasiri | ............ | G01C 19/5712 73/514.29 |
| 2006/0272410 A1 | 12/2006 | Mao et al. | | |
| 2007/0214883 A1* | 9/2007 | Durante | ............ | G01C 19/5712 73/504.04 |
| 2008/0092652 A1* | 4/2008 | Acar | ............ | G01C 19/5712 73/504.02 |
| 2008/0282833 A1* | 11/2008 | Chaumet | ............ | G01C 19/5747 74/5 R |
| 2009/0064780 A1* | 3/2009 | Coronato | ............ | G01P 15/14 73/504.08 |
| 2009/0090200 A1* | 4/2009 | Mita | ............ | G01C 19/574 74/5.7 |
| 2010/0294039 A1 | 11/2010 | Geen | | |
| 2011/0030474 A1* | 2/2011 | Kuang | ............ | G01C 19/5712 73/504.16 |
| 2011/0061460 A1* | 3/2011 | Seeger | ............ | G01C 19/5712 73/504.12 |
| 2011/0094301 A1* | 4/2011 | Rocchi | ............ | G01C 19/574 73/504.08 |
| 2011/0167891 A1* | 7/2011 | Geen | ............ | G01C 25/005 73/1.38 |
| 2011/0185813 A1* | 8/2011 | Classen | ............ | G01C 19/5747 73/504.13 |
| 2012/0024056 A1* | 2/2012 | Hammer | ............ | G01C 19/5712 73/504.02 |
| 2012/0048017 A1 | 3/2012 | Kempe | | |
| 2012/0279300 A1* | 11/2012 | Walther | ............ | G01P 15/08 73/504.03 |
| 2013/0283908 A1* | 10/2013 | Geen | ............ | G01C 19/5719 73/504.12 |
| 2014/0060184 A1 | 3/2014 | Walther | | |
| 2014/0182375 A1* | 7/2014 | Kim | ............ | G01C 19/56 73/504.12 |
| 2015/0128700 A1* | 5/2015 | Neul | ............ | G01C 19/574 73/504.04 |
| 2015/0211854 A1* | 7/2015 | Ruohio | ............ | B81B 3/0043 73/504.12 |
| 2015/0330783 A1* | 11/2015 | Rocchi | ............ | G01C 19/5747 73/504.12 |
| 2016/0025492 A1* | 1/2016 | Rocchi | ............ | G01C 19/574 73/504.08 |
| 2016/0231115 A1* | 8/2016 | Piirainen | ............ | G01C 19/5712 |
| 2016/0231116 A1 | 8/2016 | Piirainen | | |
| 2016/0231118 A1* | 8/2016 | Trusov | ............ | G01C 19/574 |
| 2016/0313123 A1* | 10/2016 | Valzasina | ............ | G01C 19/5719 |
| 2017/0268879 A1* | 9/2017 | Andersson | ............ | G01C 19/574 |
| 2018/0031602 A1* | 2/2018 | Huang | ............ | G01P 15/125 |
| 2018/0058853 A1* | 3/2018 | Jia | ............ | G01C 19/5712 |
| 2018/0172446 A1* | 6/2018 | Prikhodko | ............ | G01C 19/574 |
| 2018/0172447 A1 | 6/2018 | Prikhodko et al. | | |
| 2018/0292211 A1* | 10/2018 | Besson | ............ | G01R 33/093 |
| 2019/0017823 A1 | 1/2019 | Shao | | |
| 2020/0200535 A1* | 6/2020 | Kuisma | ............ | G01C 19/5712 |
| 2020/0263988 A1* | 8/2020 | Blomqvist | ............ | G01C 19/5712 |

OTHER PUBLICATIONS

European Search Report dated Jun. 11, 2020 corresponding to European Patent Application No. 20154071.

* cited by examiner

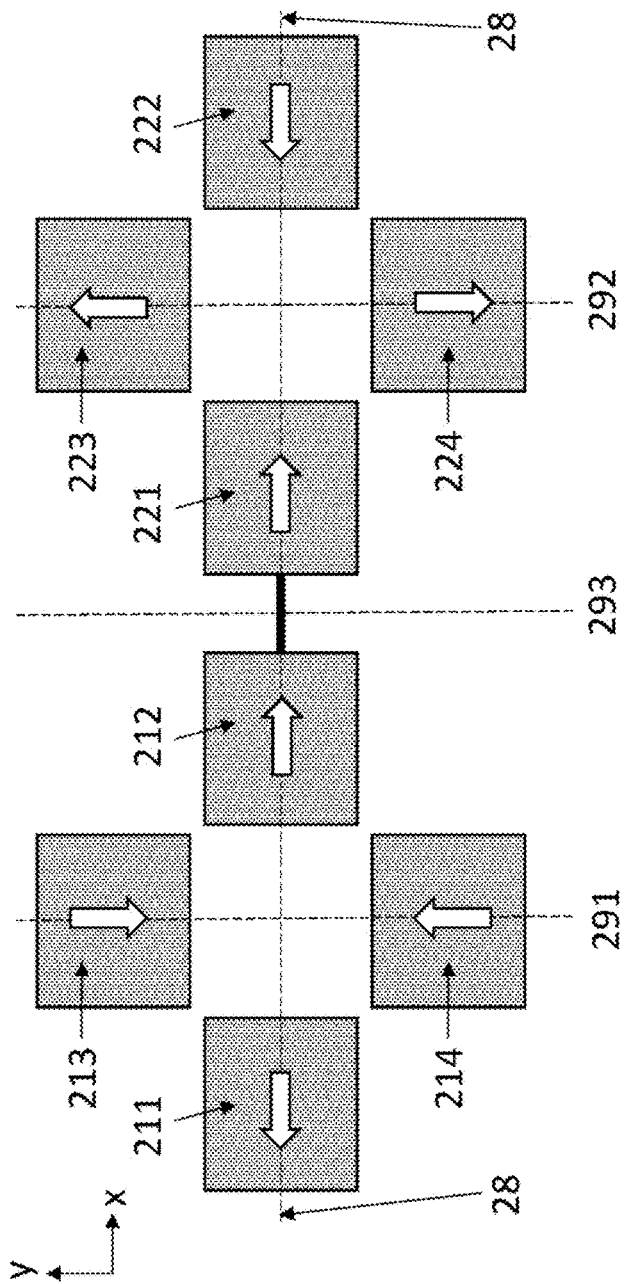

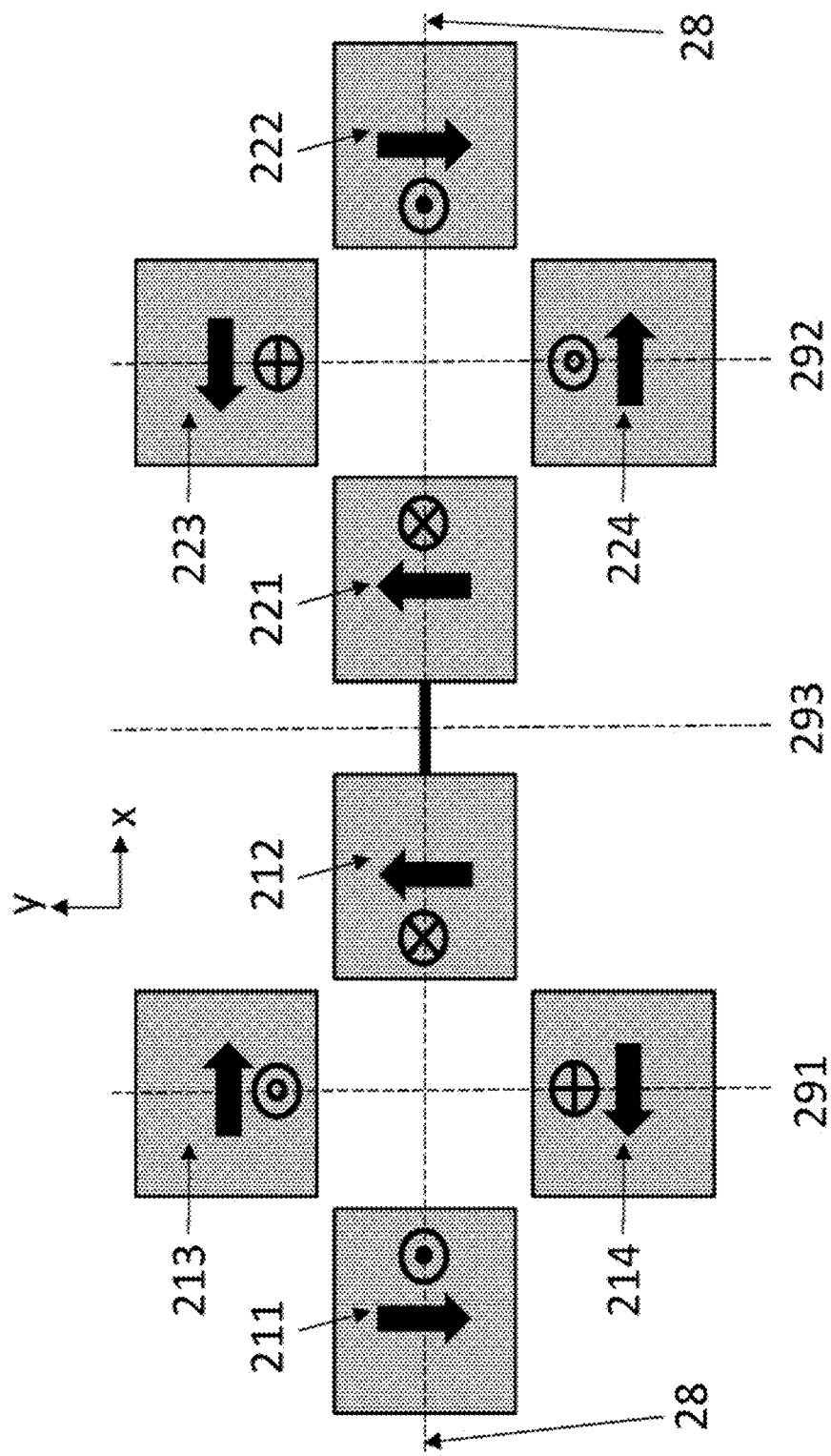

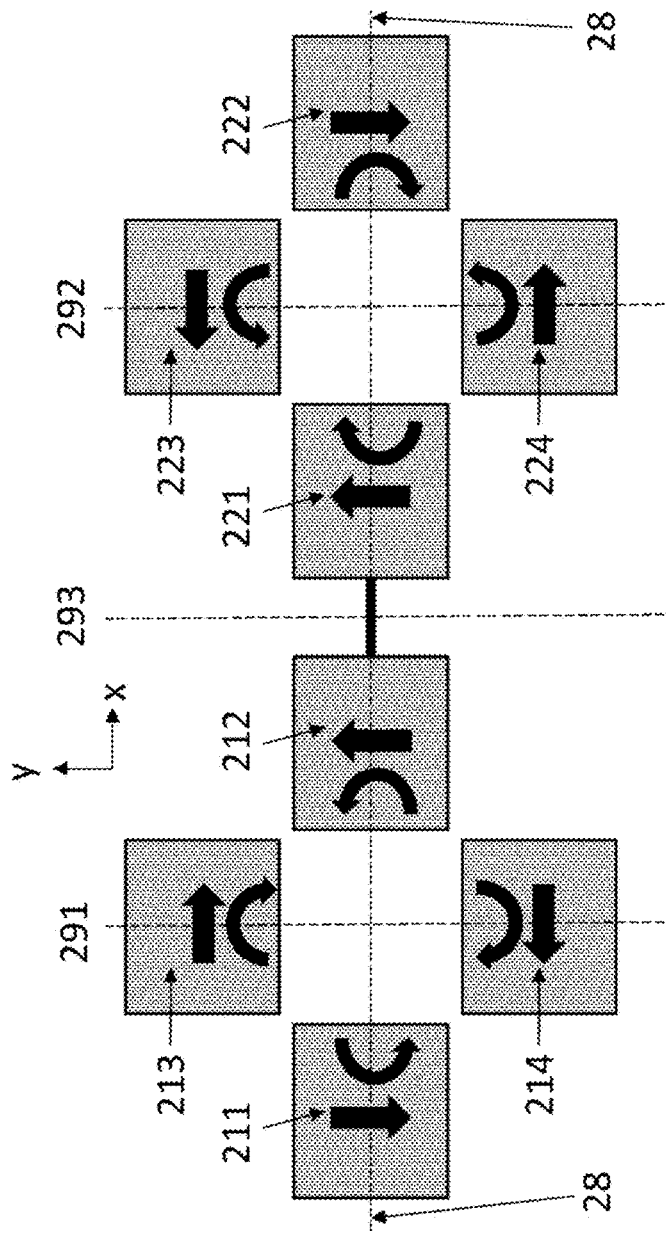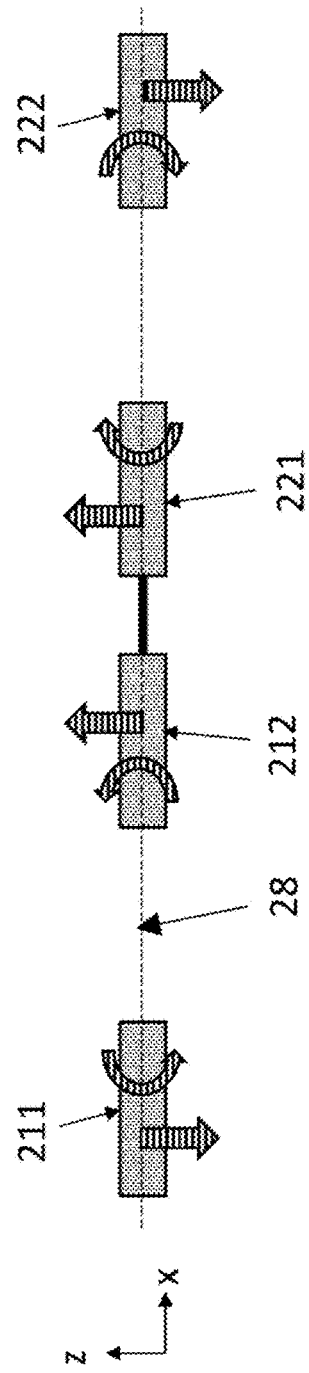
Fig. 2c
Fig. 2d

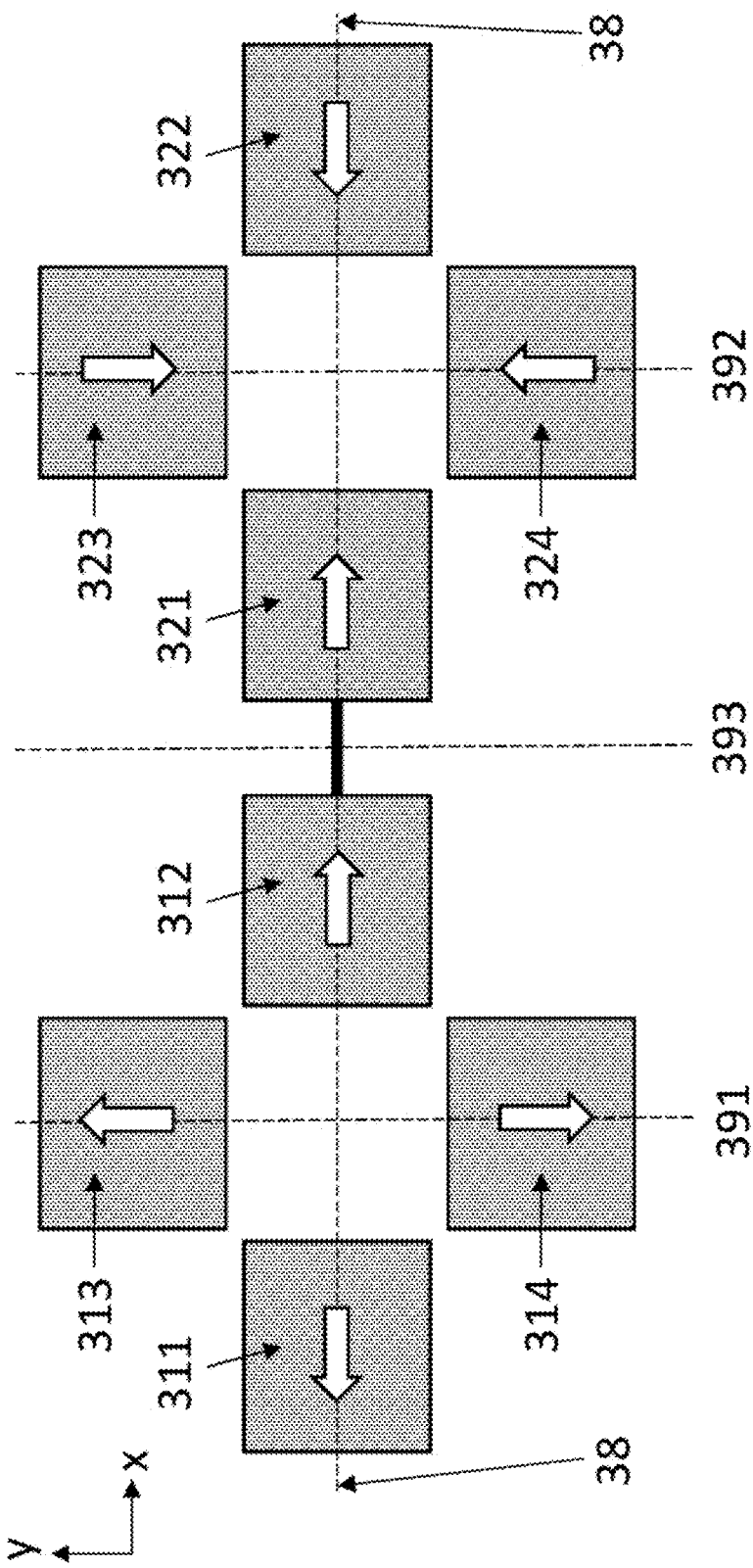

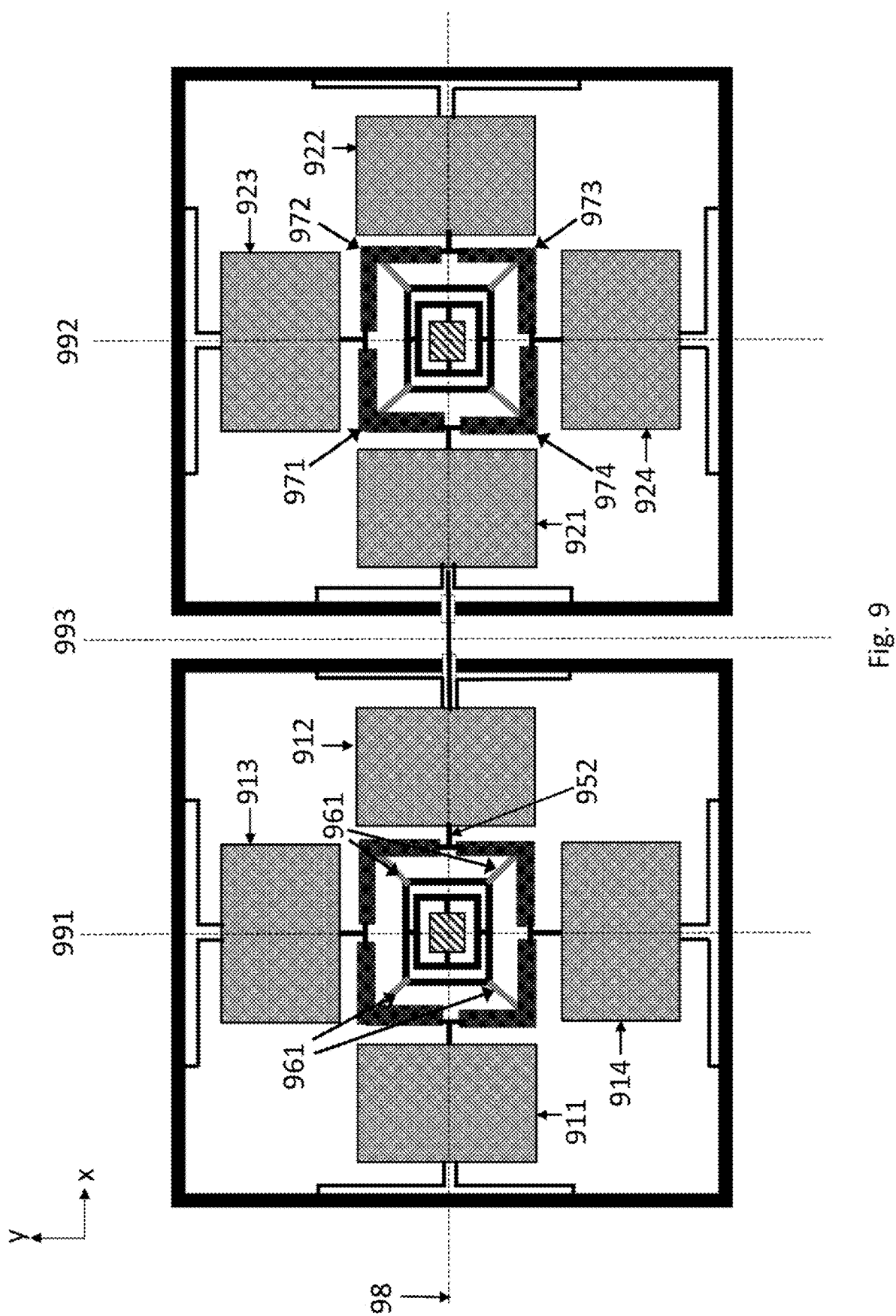

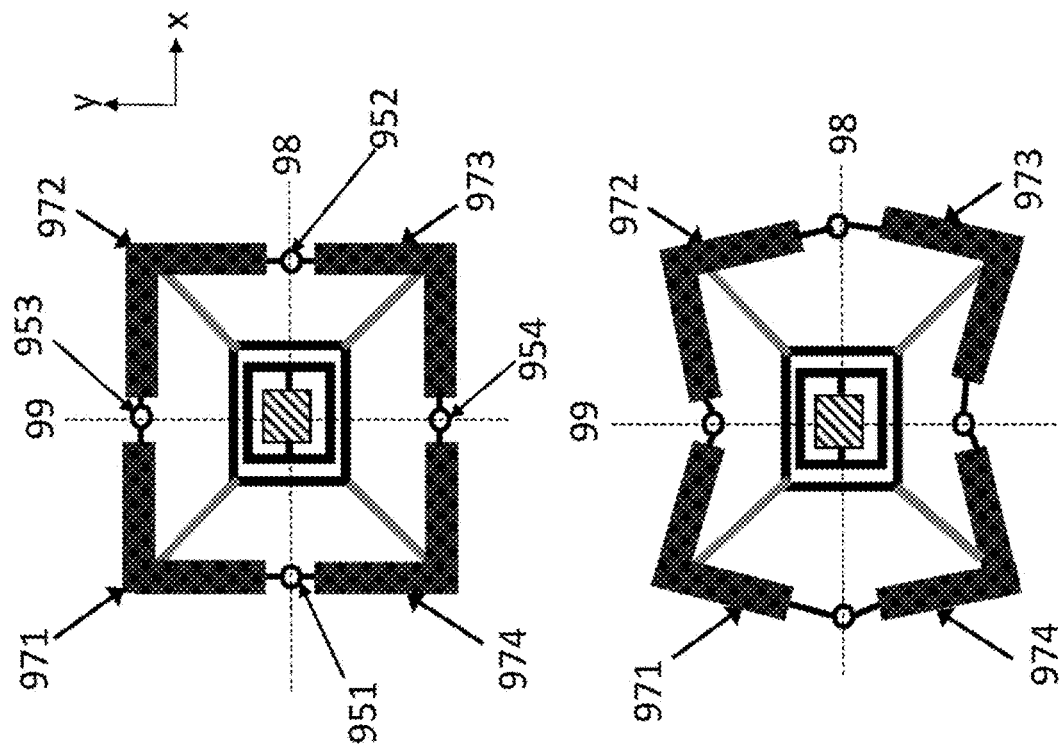
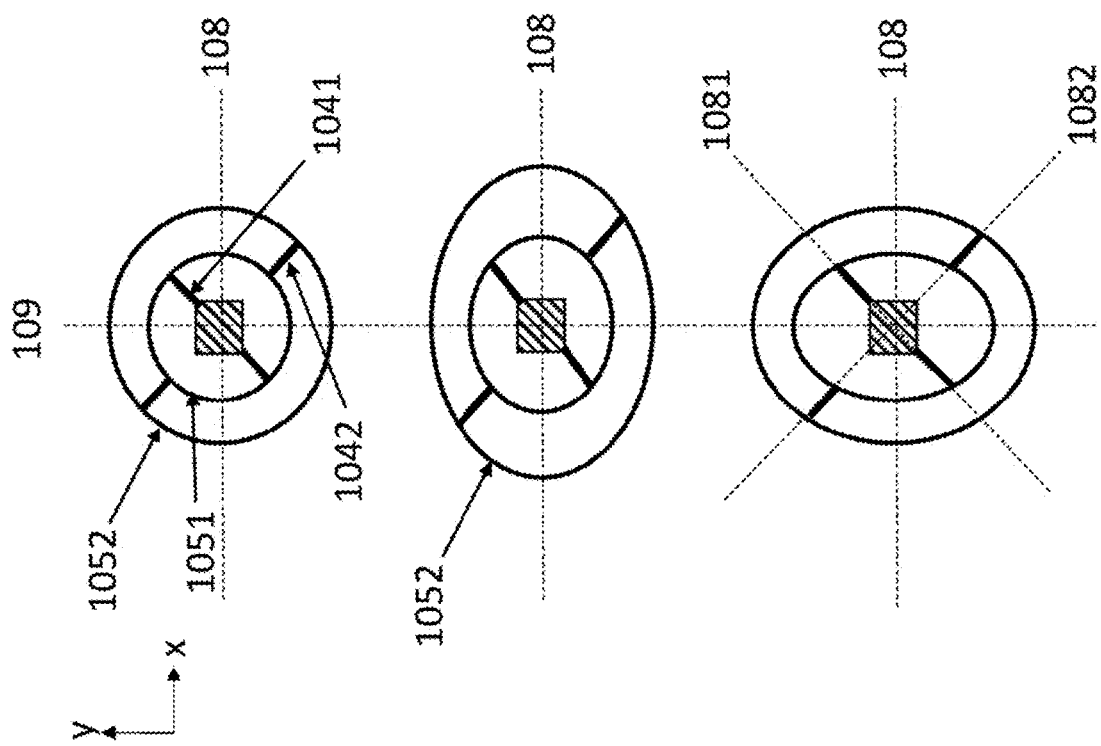
Fig. 11
Fig. 10

BALANCED MULTIAXIS GYROSCOPE

FIELD OF THE DISCLOSURE

This disclosure relates to microelectromechanical gyroscopes, and more particularly to multiaxis gyroscopes where the same oscillating proof mass system can be used for measuring angular rotation about one, two or three mutually perpendicular rotations axes.

BACKGROUND OF THE DISCLOSURE

A general challenge in microelectromechanical (MEMS) gyroscopes utilizing oscillating proof masses is that the masses should preferably be easily driven into a primary oscillation mode (which may also be called the drive oscillation mode) by drive actuators, and also be easily set into a secondary oscillation mode (which may also be called the sense oscillation mode) by the Coriolis force, but still preferably not be moved by external disturbances.

In other words, a gyroscope should preferably be unperturbed by linear and rotational vibrations imparted to it by surrounding elements at frequencies that are above the measurement frequency range, so that its output signal is determined only by the angular rotation rate which the gyroscope undergoes within the intended measurement frequency range. In automotive applications, for example, the disturbing vibrations typically lie in the frequency range 1 . . . 50 kHz, whereas the measurement frequency range is typically below 1 kHz.

A simple MEMS gyroscope may be constructed utilizing only one oscillating proof mass, but its output signal will typically be very noisy if external vibrations are present at a frequency close to the oscillating frequency of the gyroscope. Such a gyroscope is practical only at oscillation frequencies above 50 kHz where the sensitivity of the gyroscope may be very low and other disturbing effects, such as quadrature signals that arise from manufacturing imperfections, may become very prominent. It is known that a proof mass system where two or four proof masses oscillate in anti-phase can be made much more robust than a one-mass gyroscope because signal components arising from vibrations that induce cophasal movement of the two or four proof masses can be automatically cancelled to some degree via differential measurements. Further, if the cophasal resonant frequency can be brought above 50 kHz without affecting the differential resonant frequency, the gyroscope may be very robust to external vibrations since there is no resonance amplification for the disturbing vibrations.

A multi-axis gyroscope can be created by incorporating two or three one-axis gyroscopes for different axes of rotation in the same device. This kind of multi-axis gyroscope will have two or three discrete oscillation frequencies, which makes the design of the electronic circuit difficult. Multiple sustaining and stabilizing circuits are then also needed for the primary oscillation. Some multiaxis MEMS gyroscopes are designed for measuring rotation rate about the x-, y-, and/or z-axis with the same set of oscillating proof masses to avoid the possible interference between different frequencies.

It is difficult to make multiaxis gyroscopes based on a single oscillation frequency robust against external disturbances because all the proof masses must be given freedom to oscillate in many different directions in order to be free to assume any of the secondary oscillation modes associated with angular rotation about the three mutually orthogonal axes. External vibrations must still be suppressed in the partly flexible suspension and coupling arrangements which attach the proof masses to a fixed structure or cancelled in differential measurements. It is difficult to obtain robustness against external vibrations and isolation of all oscillation modes from energy leakage in multiaxis gyroscopes utilizing two or four proof masses.

BRIEF DESCRIPTION OF THE DISCLOSURE

An object of the present disclosure is to provide an apparatus for alleviating the above disadvantages.

The object of the disclosure is achieved by an arrangement which is characterized by what is stated in the independent claims. The preferred embodiments of the disclosure are disclosed in the dependent claims.

The disclosure is based on the idea of suspending two adjacent sets of proof masses from respective frames in the device plane and suspending the frames so that they can turn out of the device plane when the gyroscope undergoes angular rotation about an axis which lies within the device plane.

BRIEF DESCRIPTION OF THE DRAWINGS

In the following the disclosure will be described in greater detail by means of preferred embodiments with reference to the accompanying drawings, in which FIG. 1 explains the symbols used in FIGS. 2a-2d, 3a-3b and 4a-4b.

FIGS. 2a-2d illustrate a first primary oscillation mode and corresponding secondary oscillation modes.

FIGS. 3a-3b illustrate a second primary oscillation mode and corresponding secondary oscillation modes.

FIG. 9 illustrates an alternative central suspension arrangement.

FIG. 10 illustrates the operating principle of the central suspension structure in FIG. 8.

FIG. 11 illustrates the operating principle of the central suspension structure in FIG. 9.

DETAILED DESCRIPTION OF THE DISCLOSURE

Figure 3B:
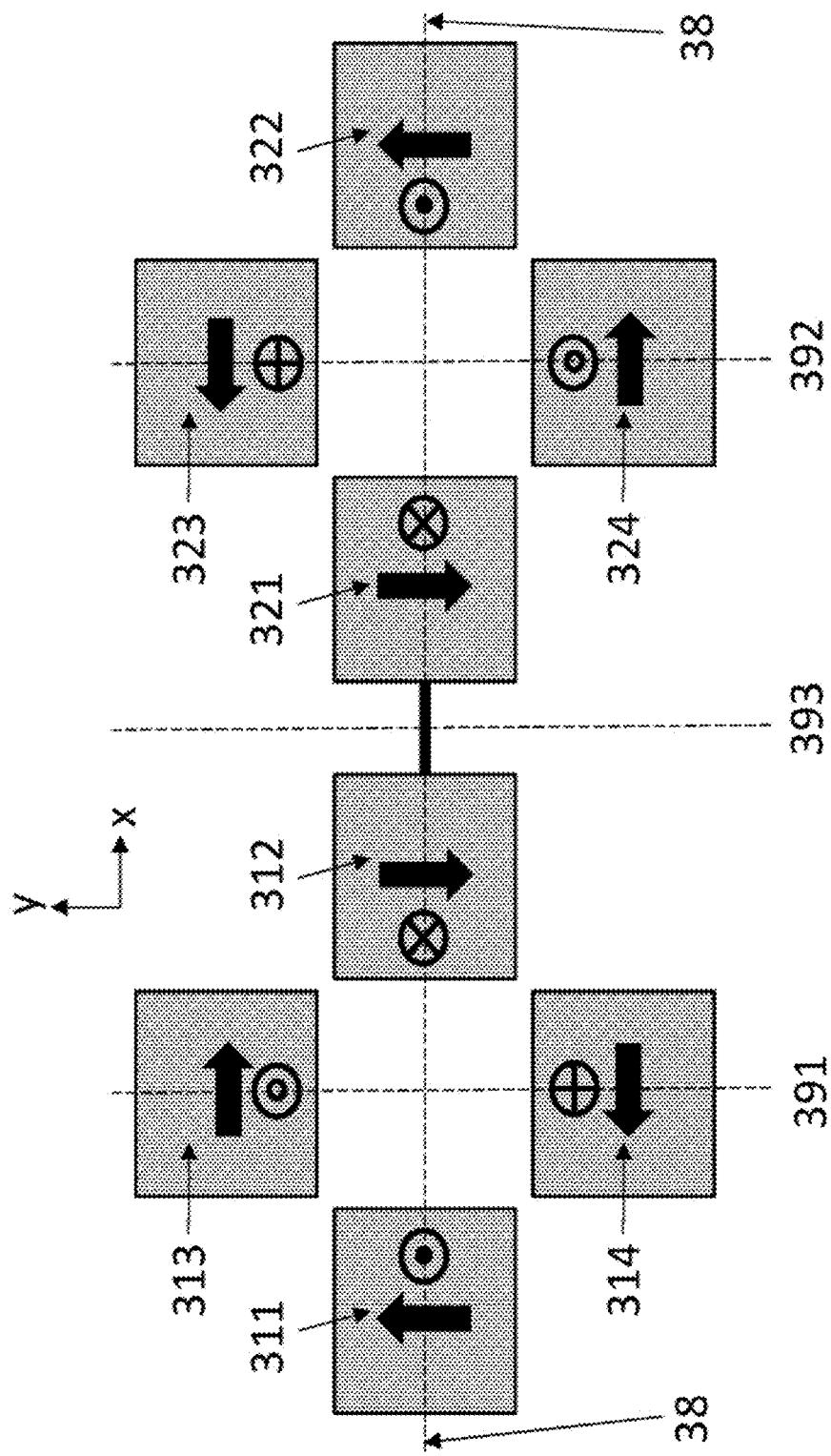

This disclosure describes a gyroscope which comprises a first proof mass quartet which in its rest position lies in a device plane, and an adjacent second proof mass quartet which in its rest position lies in the device plane. A corresponding first quartet center point and a corresponding second quartet center point lie on a lateral axis in the device plane.

The four proof masses which form the first proof mass quartet are in their rest positions symmetrically arranged around the first quartet center point where the lateral axis crosses a first transversal axis orthogonally in the device plane. The four proof masses which form the second proof mass quartet are in their rest position symmetrically arranged around the second quartet center point where the lateral axis crosses a second transversal axis orthogonally in the device plane. The gyroscope further comprises a third transversal axis which crosses the lateral axis substantially halfway between the first quartet center point and the second quartet center point.

First and second proof masses in both the first and the second proof mass quartet are aligned on the lateral axis in their rest position. Third and fourth proof masses in the first proof mass quartet are aligned on the first transversal axis in their rest position. Third and fourth proof masses in the second proof mass quartet are aligned on the second transversal axis in their rest position. The rest positions of the first, second, third and fourth proof masses in relation to the corresponding quartet center point are the same in both the first and the second quartet, so that the third proof masses in both proof mass quartets are located on a first side of the lateral axis, and the fourth proof masses in both proof mass quartets are located on a second side of the lateral axis. The second proof mass in the first proof mass quartet and the first proof mass in the second proof mass quartet are adjacent to each other on opposing sides of the third transversal axis.

The gyroscope also comprises a first central anchor point located at the first quartet center point and a second central anchor point located at the second quartet center point. The gyroscope further comprises one or more drive transducers for setting the first and second proof mass quartets into primary oscillating motion, and one or more sense transducers for detecting secondary oscillating motion of the first and second proof mass quartets which is induced by the Coriolis force if the gyroscope undergoes angular rotation.

The gyroscope further comprises a suspension arrangement for suspending the first and second proof mass quartets from the central anchor points. The suspension arrangement is configured to accommodate the primary and secondary oscillating motion of the first and second proof mass quartets.

The suspension arrangement comprises a first central suspension arrangement centred around the first quartet center point inside the first proof mass quartet and a second central suspension arrangement centred around the second quartet center point inside the second proof mass quartet. Each central suspension arrangement flexibly facilitates radial oscillation and tangential in-plane and out-of-plane oscillation of each proof mass, The suspension arrangement further comprises a first peripheral suspension arrangement centred around the first quartet center point outside of the first proof mass quartet, and a second peripheral suspension arrangement centred around the second quartet center point outside of the second proof mass quartet. The first peripheral suspension arrangement comprises a first synchronization frame, and the second peripheral suspension arrangement comprises a second synchronization frame. Each synchronization frame surrounds the corresponding proof mass quartet, and each proof mass is coupled to the surrounding synchronization frame with one or more frame suspension springs.

The gyroscope further comprises a lateral synchronization spring which extends on the lateral axis from the second proof mass in the first proof mass quartet to the first proof mass in the second proof mass quartet.

In this disclosure the device plane is illustrated and referred to as the xy-plane. It may also be called the horizontal plane. The z-axis is perpendicular to the xy-plane. It may also be called the vertical axis. Linear and/or rotational motion where the proof mass remains level in the device plane when it moves away from its rest position may be referred to as "in-plane" motion or "motion in the device plane", while linear and/or rotational motion where the proof mass moves away from its rest position in a vertical direction may be referred to as "out-of-plane" motion, or "motion out of the device plane".

In the remaining parts of this disclosure, rotation about any axis perpendicular to the device plane will be referred to simply as rotation about the z-axis. Similarly, rotation about any axis parallel to the illustrated x-axis will be referred to as rotation about the x-axis, and rotation about any axis parallel to the illustrated y-axis will be referred to as rotation about the y-axis.

In this disclosure, "radial" oscillation refers to linear movement in the xy-plane, away from a central point and towards a central point. "Tangential" oscillation refers to movement in the xy-plane, the xz-plane, or the yz-plane, along the tangent of an imaginary circle centered at a central point.

In-plane and out-of-plane tangential oscillation may in practice be a mixture of linear movement and rotation. The suspension arrangement will determine how the proof masses move tangentially.

In the figures of this disclosure, the placement of the proof masses in the first and second proof mass quartets correspond to their rest positions. The oscillation directions of the proof masses in the different embodiments of this disclosure, and the phase relationships between the oscillations, will be illustrated using the symbols presented in FIG. 1. The white arrow shown on row 11 illustrates the primary oscillation mode which occurs in the device plane. The black arrow on row 12 illustrates the secondary mode which will occur in the device plane when the gyroscope undergoes rotation about the z-axis. The pair of symbols illustrated on row 13 will always be used together to illustrate the out-of-plane movement of a pair proof masses when the gyroscope undergoes rotation about the x-axis. The pair of symbols illustrated on row 14 will always be used together to illustrate the out-of-plane movement of a pair proof masses when the gyroscope undergoes rotation about the y-axis. The dotted symbols illustrated on row 15 will be used to illustrate cophasal oscillation modes which should preferably be suppressed so that their resonant frequency becomes significantly higher than the resonance frequency of the desired modes illustrated on rows 11-14.

The gyroscope described in this disclosure may be operated either in a first primary oscillation mode or in a second primary oscillation mode. The secondary oscillation modes are determined by the primary oscillation mode. FIG. 2a illustrates schematically a microelectromechanical gyroscope with a first proof mass quartet and a second proof mass quartet, and the first primary oscillation mode.

The gyroscope comprises a first proof mass of the first proof mass quartet 211, a second proof mass of the first proof mass quartet 212, a third proof mass of the first proof mass quartet 213, and a fourth proof mass of the first proof mass quartet 214. The gyroscope also comprises a first proof mass of the second proof mass quartet 221, a second proof mass of the second proof mass quartet 222, a third proof mass of the second proof mass quartet 223, and a fourth proof mass of the second proof mass quartet 224.

The first quartet center point is the point where the lateral axis 28 crosses the first transversal axis 291. The second quartet center point is the point where the lateral axis 28 crosses the second transversal axis 292. A third transversal axis 293 crosses the lateral axis 28 between the second proof mass of the first proof mass quartet 212 and the first proof mass of the second proof mass quartet 221, as illustrated in FIG. 2a.

All proof masses may be suspended from a fixed support by flexible suspension springs (not illustrated in FIG. 2a) which allow oscillating movement. The gyroscope may also comprise capacitive or piezoelectric actuators (not illustrated in FIG. 2a) and a control unit which is configured to apply one or more drive voltage signals to the actuators. The control unit can thereby drive the primary oscillation of the proof masses. When the gyroscope undergoes rotation about the x-, y- or z-axis, the Coriolis force sets at least some proof masses into secondary oscillation.

The gyroscope may further comprise coupling springs which synchronize motion of the proof masses so that the desired oscillation phases, which will be described in more detail below, are obtained. Some proof masses may not be directly connected to actuators. Their primary oscillation may instead be indirectly actuated by coupling springs which transmit the motion of one proof mass the proof mass which is not directly connected to actuators.

The suspension springs may include central suspension arrangements formed near the quartet center points and peripheral suspension arrangements which support the weight of the proof masses, and/or the weight of peripheral synchronization structures, closer to the periphery of the gyroscope.

The first primary oscillation mode comprises motion where each proof mass oscillates in a radial direction in relation to the corresponding quartet center point. As shown in FIG. 2a, the first primary oscillation mode of the two proof mass quartets is driven so that the direction of motion (or, in other words, the phase) of each proof mass in the first proof mass quartet is opposite to the direction of motion (phase) of the corresponding proof mass in the second proof mass quartet. In other words, in the illustrated half-cycle of oscillation, the first proof mass 211 of the first proof mass quartet moves away from the first quartet center point as the first proof mass 221 of the second proof mass quartet moves toward the second quartet center point. In the next phase, the movements of these two proof masses will be in the opposite directions. The same considerations apply to every pair of corresponding proof masses in the proof mass quartets: 212+222, 213+223 and 214+224. The first primary oscillation mode thereby moves the first and second proof mass quartets in anti-phase in relation to each other. This anti-phase primary oscillation generates corresponding anti-phase secondary oscillation modes, as described below. In this oscillation mode, the movement of proof masses 212 and 221 along the x-axis may be synchronized with a lateral synchronization spring 255. Other means of synchronization will be described below.

The secondary oscillation modes of the first and second proof mass quartets include a first z-axis secondary mode, an x-axis secondary mode, and/or a y-axis secondary mode.

In response to rotation of the gyroscope about the z-axis, the first z-axis secondary mode comprises motion where each proof mass in each proof mass quartet oscillates tangentially in the device plane in relation to the corresponding quartet center point. In response to rotation of the gyroscope about an x-axis, which is parallel to the lateral axis, the x-axis secondary mode comprises motion where each proof mass pair formed by third and fourth proof masses oscillates tangentially out of the device plane in relation to the corresponding lateral axis. And in response to rotation of the gyroscope about the y-axis, which is parallel to the first and second transversal axes, the y-axis secondary mode comprises motion where each proof mass pair formed by first and second proof masses oscillates tangentially out of the device plane in relation to the corresponding transversal axis.

FIG. 2b illustrates the corresponding secondary oscillation modes when the first primary oscillation mode is active. In response to rotation of the gyroscope about the z-axis, the Coriolis force will oscillate all proof masses tangentially. The first primary oscillation mode then induces a corresponding secondary oscillation mode where each proof mass within a proof mass pair oscillates in antiphase to the other proof mass of the pair. In this case, antiphase means that when one proof mass of a pair moves in a first lateral direction or in a first transversal direction, the other moves in an opposite lateral or transversal direction and both move in the same tangential direction (clockwise or counter-clockwise) in relation to their corresponding quartet center points. Within each proof mass quartet, one pair of proof masses (for example 211+212) oscillates in antiphase to the other pair (213+214) in the quartet. Antiphase oscillation within a proof mass quartet means that if one pair moves tangentially clockwise during a half-cycle, the other moves counter-clockwise.

Finally, the first proof mass 211 of the first proof mass quartet and the first proof mass 221 of the second proof mass quartet move in opposite tangential directions (clockwise or counter-clockwise) in relation to their corresponding quartet center points, as illustrated in FIG. 2b. The same situation again obtains for all the corresponding proof mass pairs in the two proof mass quartets: 212+222, 213+223 and 214+224.

Capacitive or piezoelectric measurement transducers may be used to determine in-plane oscillation amplitudes in the first z-axis secondary oscillation mode. Differential measurement of electrical signals from similar transducers attached to each proof mass can be used for cancelling errors and cross talk. In the following example of differential signal processing, rotational symmetry of proof mass-transducer geometry within a quartet is assumed (proof mass-transducers systems are copied, shifted and rotated) and the electrical signals from the transducers are designated by the symbols of the corresponding proof masses. Within one quartet signals that are in same phase can be summed: 211+212 and 213+214, and a difference of these two can be taken since they are in anti-phase: 211+212−213−214. Since the two quartets are in anti-phase, a difference of corresponding expressions can be taken leading finally to the total signal 211+212−213−214−221−222+223+224. It must be noted that to each proof mass a second transducer with opposite electrical polarity can be easily added. This allows increasing one additional level to the differential compensation. Also, it is possible to use a single transducer with opposite electrical polarity for any proof mass and the sign of the signal in the expression must be then changed accordingly.

In response to rotation of the gyroscope about the x-axis, the Coriolis force will oscillate the proof mass pairs (213+214 and 223+224) formed by the third and fourth proof masses in each proof mass quartet tangentially out of the device plane, as illustrated symbolically in FIG. 2b. These proof mass pairs may be joined to each other by central and/or peripheral suspension and coupling springs. These springs are not illustrated in FIG. 2b for clarity reasons but will be discussed below. Again, due to the anti-phase primary oscillation, proof mass pairs 213+214 and 223+224 will oscillate about the lateral axis 28 in anti-phase.

In response to rotation of the gyroscope about the y-axis, the Coriolis force will oscillate the proof mass pairs (211+212 and 221+222) formed by the first and second proof masses in each proof mass quartet tangentially out of the device plane as illustrated symbolically in FIG. 2b. Again, these proof mass pairs may be joined to each other with central and/or peripheral suspension and coupling springs which are not illustrated in FIG. 2b for clarity reasons. As before, due to the anti-phase primary oscillation, proof mass pairs 211+212 and 221+222 will oscillate about the respective transversal axes in anti-phase. The lateral synchronization spring 255 which connects proof mass 212 to proof mass 221 may synchronize the oscillation of these masses in the y-axis secondary oscillation mode if said spring is stiff in the vertical direction.

Capacitive or piezoelectric measurement transducers may be used to determine out-of-plane oscillation amplitudes in the x-axis and y-axis secondary oscillation modes. Differential measurement of electrical signals from similar transducers attached to each proof mass can be used for cancelling errors and cross talk. In the following example of differential signal processing the electrical signals from the transducers are designated by the symbols of the corresponding proof masses. Within one quartet signals that are in opposite phase can be differenced: 211−212 and 221−222. Since the two quartets are in anti-phase, a difference of corresponding expressions can be taken leading finally to the total signal 211−212−221+222 for detecting the signal produced by y-axis rotation. For x-axis a similar expression can be formed: 213−214−223+224. It must be noted that to each proof mass a second transducer with opposite electrical polarity can be added. This allows increasing one additional level to the differential compensation. Also, it is possible to use a single transducer with opposite electrical polarity for any proof mass and the sign of the signal in the expression must be then changed accordingly.

FIG. 2c illustrates tangential in-plane oscillation as a mixture of linear movement and rotation. FIG. 2d illustrates out-of-plane oscillation as a mixture of linear movement and rotation. The suspension arrangement will determine which component, linear movement or rotation, will predominate. These consideration on tangential and out-of-plane oscillation apply to all oscillation modes discussed in this disclosure, except radial oscillation which is purely linear.

Figure 16:
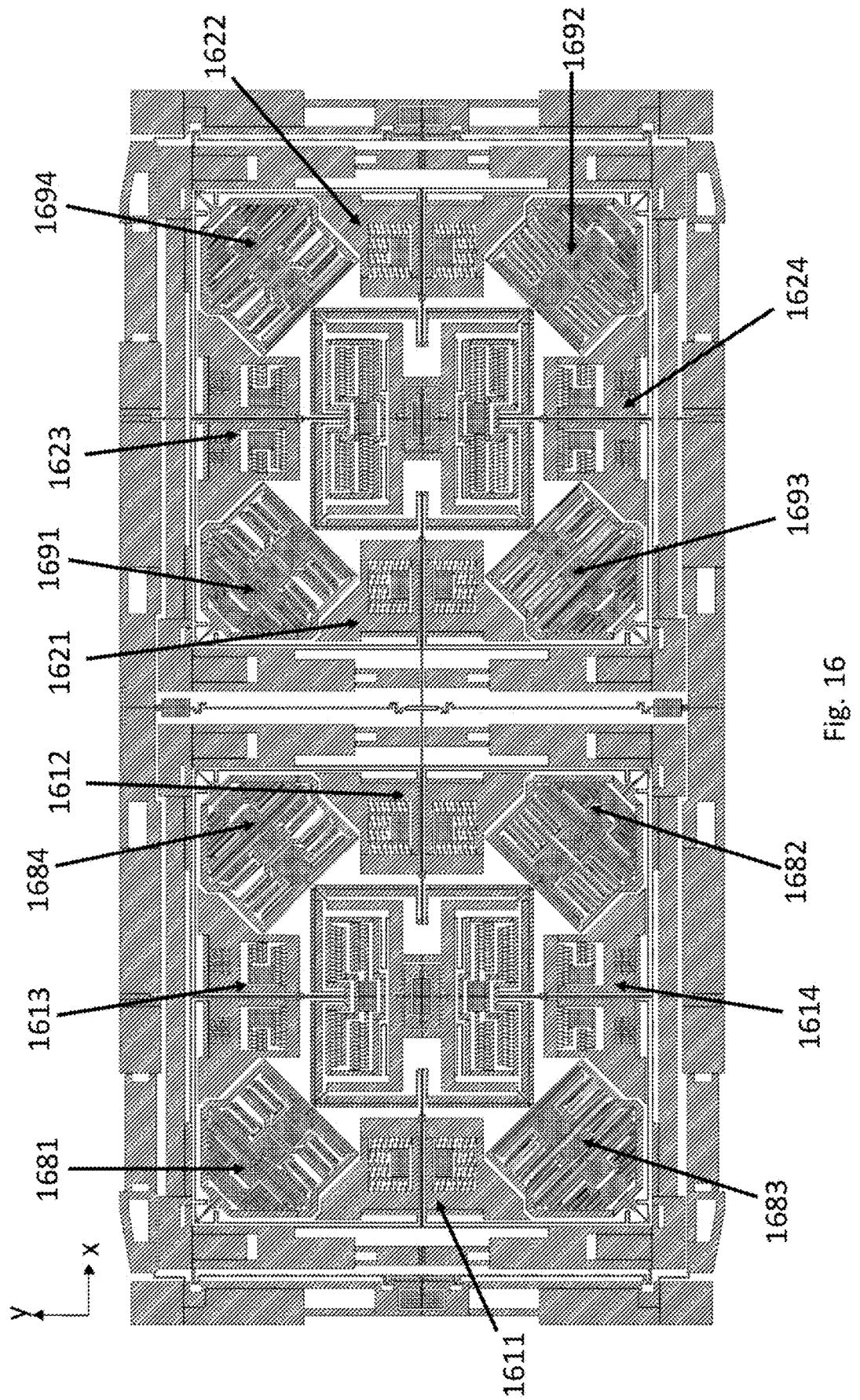
FIG. 16 illustrates another example of a detailed gyroscope structure.

Capacitive sense transducers may be implemented either within an opening in one or more proof masses in the first and second proof mass quartets in FIG. 2c, or adjacent to one or more proof masses in the first and second proof mass quartets, to detect the z-axis secondary oscillation mode. FIG. 16 illustrates some of these options. Capacitive sense transducers may be implemented above and/or below one or more proof masses in the first and second proof mass quartets in FIG. 2d to detect the x-axis and/or y-axis secondary oscillation modes.

FIGS. 3a and 3b illustrate the second primary oscillation and the consequent secondary oscillation modes, respectively. Reference numbers 311-314, 321-324, 355, 38 and 391-393 correspond to reference numbers 211-214, 221-224, 255, 28 and 291-293, respectively, in FIG. 2a, but the proof mass quartets move in a different manner.

Like the first primary oscillation mode, the second primary oscillation mode comprises motion where each proof mass oscillates in a radial direction in relation to the corresponding quartet center point. Furthermore, like the first primary oscillation mode, the second primary oscillation mode is driven so that the direction of motion (or, in other words, the phase) of each proof mass in the first proof mass quartet is opposite to the direction of motion (phase) of the corresponding proof mass in the second proof mass quartet. The lateral synchronization spring 355 which connects proof masses 312 and 321 may perform the same synchronization action in the second primary oscillation mode as in the first, and its synchronization action may also be the same in the y-axis secondary oscillation mode.

However, the second primary oscillation mode differs from the first primary oscillation mode in that all masses in one proof mass quartet move simultaneously inward towards the quartet center point and then simultaneously away from it. In the oscillation half-cycle illustrated in FIG. 3a, the proof masses 311-314 of the first proof mass quartet move away from the first quartet center point as the proof masses 321-324 of the second proof mass quartet move toward the second quartet center point. In the next half cycle, the movements of each quartet will be in the opposite direction. The second primary oscillation mode thereby moves the first and second proof mass quartets in anti-phase in relation to each other. This anti-phase primary oscillation also creates corresponding anti-phase secondary oscillation modes.

When the gyroscope is driven to oscillate in the second primary oscillation mode, the secondary oscillation modes of the first and second proof mass quartets include a second z-axis secondary mode which differs from the first z-axis secondary mode describe above, and x-axis and y-axis secondary modes which are identical to the ones which were described above when the first primary oscillation mode was discussed. To avoid repetition, only the second z-axis secondary mode will be described below.

FIG. 3b illustrates the second z-axis secondary oscillation mode, which the Coriolis force will produce when the second primary oscillation mode is active. In response to rotation of the gyroscope about the z-axis, the Coriolis force will oscillate all proof masses tangentially. In the illustrated half-cycle of oscillation case, all proof masses in the first proof mass quartet move clockwise in relation to the first quartet center point, while all proof masses in the second proof mass quartet move counter-clockwise in relation to the second quartet center point. In the next half-cycle half-cycle, these directions are reversed.

As seen in FIG. 3b, x-axis and y-axis secondary oscillation modes exhibit the same anti-phase relationship as the ones illustrated in FIG. 2b. The differential measurement arrangement for detecting the x-axis and y-axis secondary modes may correspond to the one which was described above with reference to FIG. 2b. The z-axis differential measurement arrangement described above with reference to FIG. 2b must be adjusted to account for the differences in the second z-axis secondary oscillation mode, but the general measurement principle is the same. The tangential oscillation illustrated in FIG. 3b may be a combination of linear movement and rotation, as illustrated in FIGS. 2c and 2d.

Figure 4A:
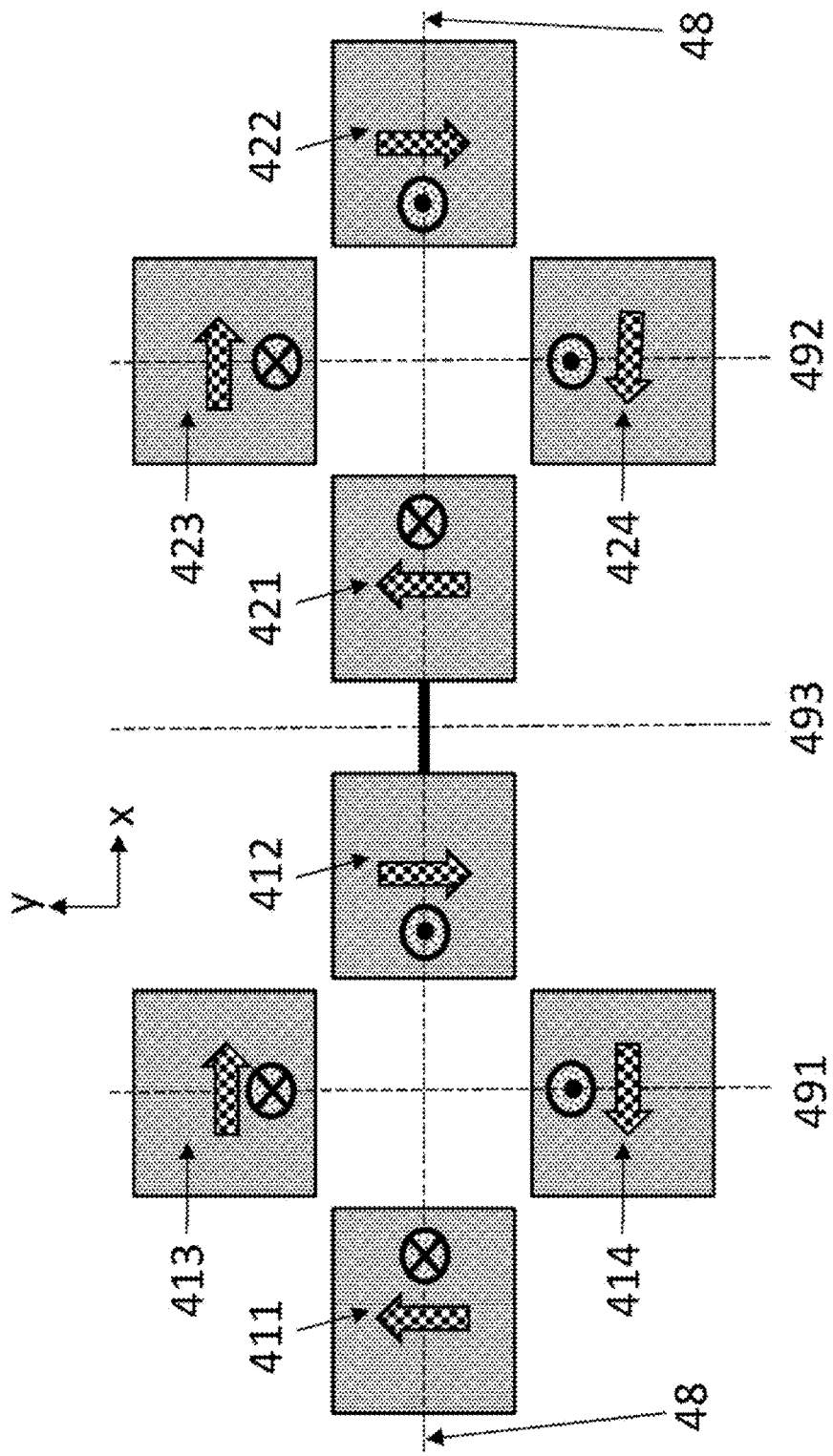
FIGS. 4a-4b illustrate undesired common oscillation modes.
Figure 4B:
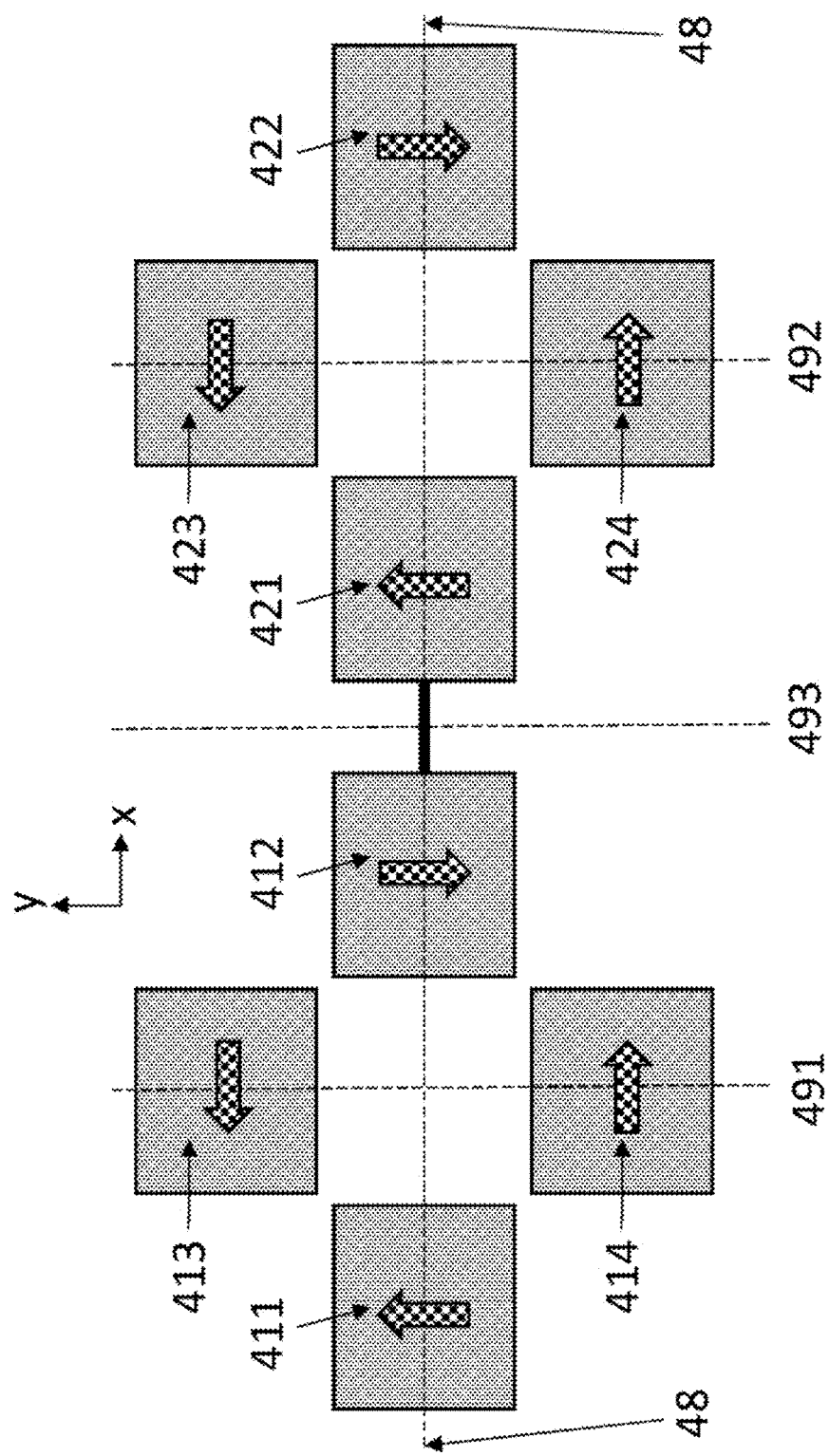

FIG. 4a illustrates three undesired secondary oscillation modes which the suspension arrangement should preferably resist, so that the resonance frequency of these modes is higher than those of the desired modes illustrated in FIGS. 2a-2d and 3a-3b. Reference numbers 411-414, 421-424, 48 and 491-493 correspond to reference numbers 211-214, 221-224, 28 and 291-293, respectively, in FIG. 2a, and to reference numbers 311-314, 321-324, 38 and 391-393, respectively, in FIG. 3a. In the z-axis common mode, all proof masses in a proof mass quartet oscillate simultaneously in the same tangential direction. In the x-axis common mode, proof mass pairs 213+214 and 223+224 oscillate in the same direction about the lateral axis. In the y-axis common mode, proof mass pairs 211+212 and 221+222 oscillate in the same direction about their respective transversal axes. Another undesired z-axis common mode is illustrated in FIG. 4b.

Throughout this disclosure, the terms "accommodate" and "facilitate", and phrases such as "structure A accommodates/facilitates oscillation mode X", have the following meaning. X designates a desired primary or secondary oscillation mode illustrated in FIG. 2a-2d or 3a-3b. The spring constant which structure A exhibits in the movement required by mode X is sufficiently small to allow the output signals measured from all secondary oscillation modes to be detected with sufficient accuracy. The required spring constant will not depend only on A and X, but also on the sense transducers, output signal conditioning, and whether optional additional elements are used to facilitate easier detection (see, for example, FIG. 12a below).

Throughout this disclosure, the term "synchronize", and phrases such as "structure A synchronizes oscillation mode X", have the following meaning. Structure A constitutes a mechanical connection in a system of interconnected mass elements which should preferably oscillate in the desired mode X, but preferably not in an undesired mode Y. Structure A exhibits a beneficial combination of rigidity and flexibility, so that the presence of structure A improves the relationship between the resonance frequency $F_X$ of mode X and the resonance frequency $F_Y$ of mode Y in the system.

The presence of structure A may, for example, increase the ratio $F_Y/F_X$ and/or the difference $F_Y-F_X$. The reference state against which this improvement is measured may in some cases be the same system of mass elements without structure A. Structure A is in this case needed only for synchronization. In other cases, when structure A is also needed for supporting the weight of the mass elements, the reference state against which the synchronization improvement is measured may be the same system of mass elements where A has been replaced with an alternative, standard structure B which only gives structural support.

In general, all suspension arrangements are optimized for support as well as flexibility in certain directions and rigidity in other directions. These three variables may conflict with each other, so optimization means finding a good compromise solution. All elements of the gyroscope may influence these compromises.

Figure 5A:
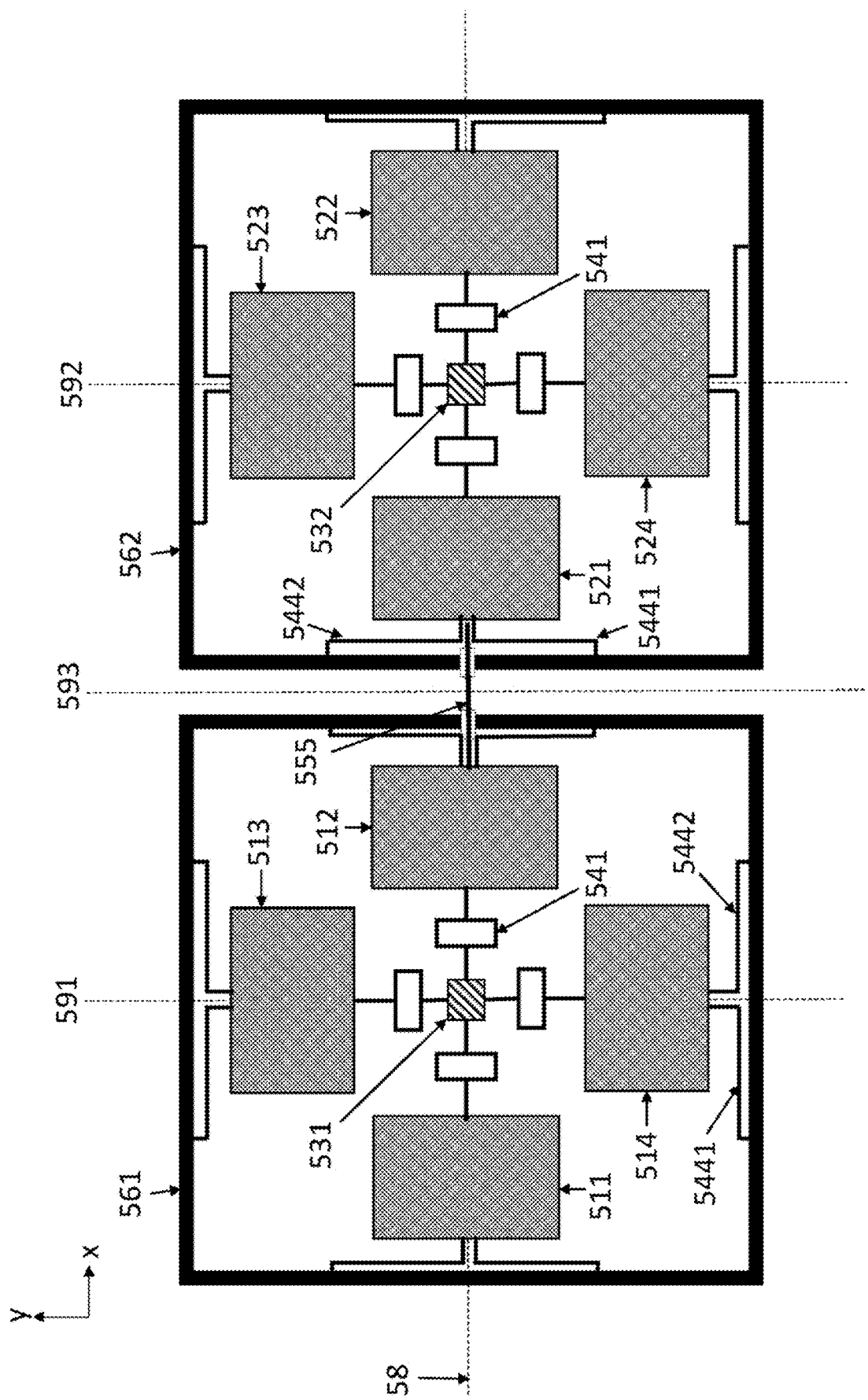
FIGS. 5a-5b illustrate gyroscopes with synchronization frames.
Figure 5B:
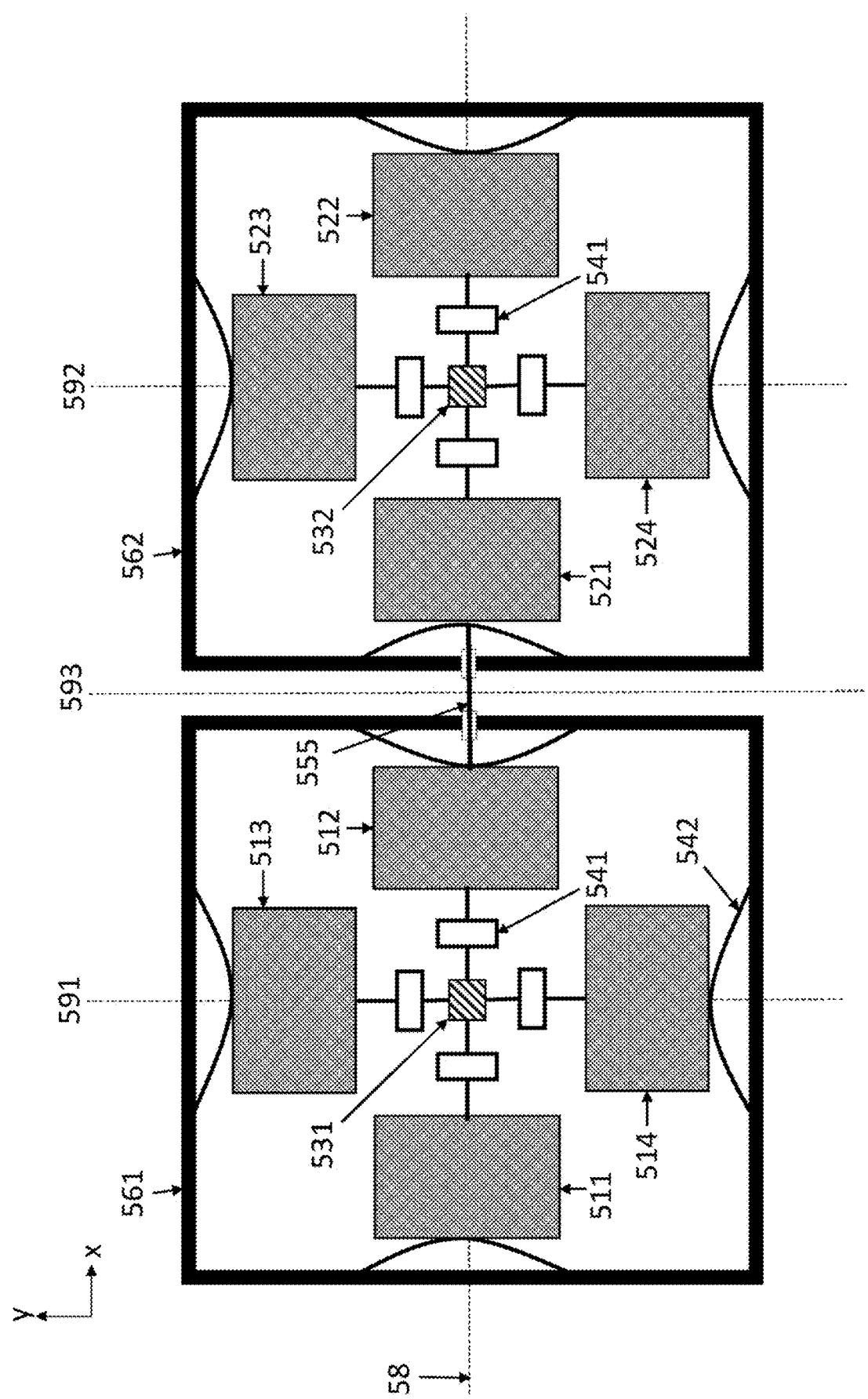

FIGS. 5a and 5b illustrate gyroscopes with suspension arrangements which accommodate and synchronize the primary and secondary oscillation modes illustrated in the preceding figures.

The gyroscopes comprise a first proof mass quartet 511-514 and a second proof mass quartet 521-524. The first lateral axis 58 extends in the x-direction across the gyroscope. The first transversal axis 591 crosses the lateral axis 58 orthogonally at the first quartet center point. The second transversal axis 592 crosses the lateral axis 58 orthogonally at the second quartet center point. The second proof mass 512 in the first proof mass quartet is adjacent to the first proof mass 521 in the second proof mass quartet. These masses lie on opposite sides of the third transversal axis 593.

The gyroscope comprises a first central anchor point 531 and a second central anchor point 532. The gyroscope also comprises a central suspension arrangement centred around each central anchor point. The central suspension arrangement lies inside of the proof mass quartet. One central suspension spring 541 extends from the central anchor points 531 and 532 to each of the surrounding proof masses. The central suspension springs carry the weight of the proof masses on the inner side. They may for example have a meandering shape which gives them radial and tangential in-plane flexibility and tangential out-of-plane flexibility. The central suspension springs thereby accommodate the first and second primary modes illustrated in FIGS. 2a and 3a and the z-axis secondary modes illustrated in FIGS. 2b and 3b.

A lateral synchronization spring 555 extends along the lateral axis from second proof mass 512 in the first proof mass quartet to the first proof mass 521 in the second proof mass quartet. This spring should preferably be stiff in the lateral direction in order to synchronize the anti-phase movement of the first and second proof mass quartets in primary oscillation in the manner illustrated in FIGS. 2a and 3a. It should also be stiff in the vertical direction to synchronize the out-of-plane movement of the proof masses 512 and 521 in the y-axis secondary mode illustrated in FIGS. 2b and 3b. However, the lateral synchronization spring 555 may still exhibit some flexibility for transversal bending to accommodate the z-axis secondary mode illustrated in FIG. 2c, where proof masses 212 and 221 move in the same direction but may also rotate slightly in opposite directions.

Furthermore, if the transversal flexibility of the lateral synchronization spring is sufficiently high, the z-axis secondary oscillation modes of the first proof mass quartet and the second proof mass quartet can be effectively decoupled. This may allow the first and second proof mass quartet to oscillate as independent resonators, which can provide significant benefits in z-axis measurement accuracy. Sufficiently independent resonators may for example be achieved if the spring constant of the lateral synchronization spring 555 for transversal bending is smaller, by a factor of 10 or more, than the combined spring constants of frame suspension springs 5441 and 5442 for tangential oscillation.

A peripheral suspension arrangement surrounds each proof mass quartet. This arrangement includes a first synchronization frame 561 which surrounds the first proof mass quartet and a second synchronization frame 562 which surrounds the second proof mass quartet. Each proof mass is coupled to the surrounding synchronization frame with a frame suspension spring, so that the synchronization frames 561 and 562 are suspended from the central anchor points 531 and 532, respectively, via the proof masses.

The number of frame suspension springs may be greater than four, so that some or all proof masses in the proof mass quartet are suspended from the synchronization frames 561-562 with more than one frame suspension springs. FIG. 5a illustrates frame suspension springs which are suitable both for the first drive oscillation mode illustrated in FIG. 2a and for the second drive oscillation mode illustrated in FIG. 3a. Each proof mass in the proof mass quartet is attached to the corresponding synchronization frame with two frame suspension springs, such as 5441 and 5442 in the case of proof mass 514.

Each frame suspension spring 5441 and 5442 extends from a first attachment point on the synchronization frame 561 to a second attachment point on the adjacent proof mass 514. The frame suspension springs 5441 and 5442 comprise both lateral and transversal elongated parts which give the springs both radial and tangential flexibility. The elongated part which is parallel to the adjacent side of the synchronization frame may be longer than the part which is orthogonal to that side, since the amplitude of the radial primary oscillation modes is typically significantly larger than the amplitude of the tangential secondary oscillation mode. The frame suspension springs illustrated in FIG. 5a can be implemented, with any other central or peripheral suspension arrangement presented in this disclosure.

FIG. 5b illustrates an alternative frame suspension spring embodiment which is suitable for the second primary oscillation mode. Each proof mass is attached to the corresponding synchronization frame with only one frame suspension spring, such as 542 in the case of proof mass 514. The frame suspension springs 542 extend from a first attachment point on the corresponding frame to a second attachment point on the corresponding frame, and the middle of the frame suspension spring is attached to the corresponding proof mass in the middle. The frame suspension springs 542 carry the weight of each proof mass on the outer side and are flexible for radial in-plane oscillation of the proof mass, so that the second primary oscillation mode illustrated in FIG. 3a is accommodated.

Furthermore, even though the frame suspension springs 542 lack flexibility in the in-plane tangential direction, the peripheral suspension arrangement illustrated in FIG. 5b nevertheless accommodates, and synchronizes, the z-axis secondary oscillation mode illustrated in FIG. 3b. When the masses are driven into primary oscillation in the oscillation mode illustrated in FIG. 3a, they will all simultaneously move in the same in-plane tangential direction in the z-axis secondary mode, as illustrated in FIG. 3b. This motion can be accommodated and synchronized by clockwise and counter-clockwise turning of the synchronization frames 561 and 562 about the z-axes which cross the central anchor points 531 and 532, respectively.

The first and second synchronization frames may comprise a narrow gap on the lateral axis, as illustrated in FIGS. 5a and 5b, where the lateral synchronization spring 555 can pass through.

Alternatively, the lateral synchronization spring 555 may be vertically separated from synchronization frames 561 and 562 and from the transversal suspension springs 575. In this case the synchronization frames 561 and 562 may be unitary frames without any gap on the lateral axis.

The synchronization frames 561 and 562 can undergo rotational movement about the lateral axis 58 and the first and second transversal axis 591 and 592, respectively, when the gyroscope undergoes angular rotation about the x-axis and/or the y-axis. The x-axis and y-axis secondary oscillation modes are thereby synchronized within each proof mass quartet, since the out-of-plane motion of a proof mass pair (511+512, for example) always involves movement in opposite directions (511 moves in the positive z-direction when 512 moves in the negative z-direction, for example, and vice versa). The amplitude of the secondary oscillation modes is small compared to the dimensions of the proof masses and the synchronization frames.

In any embodiment presented in this disclosure, capacitive drive transducers may for example be implemented in openings formed within the proof masses of the first and second proof mass quartets. The drive transducers may alternatively be piezoelectric transducers. Capacitive drive transducers are illustrated in FIG. 16.

Figure 6:
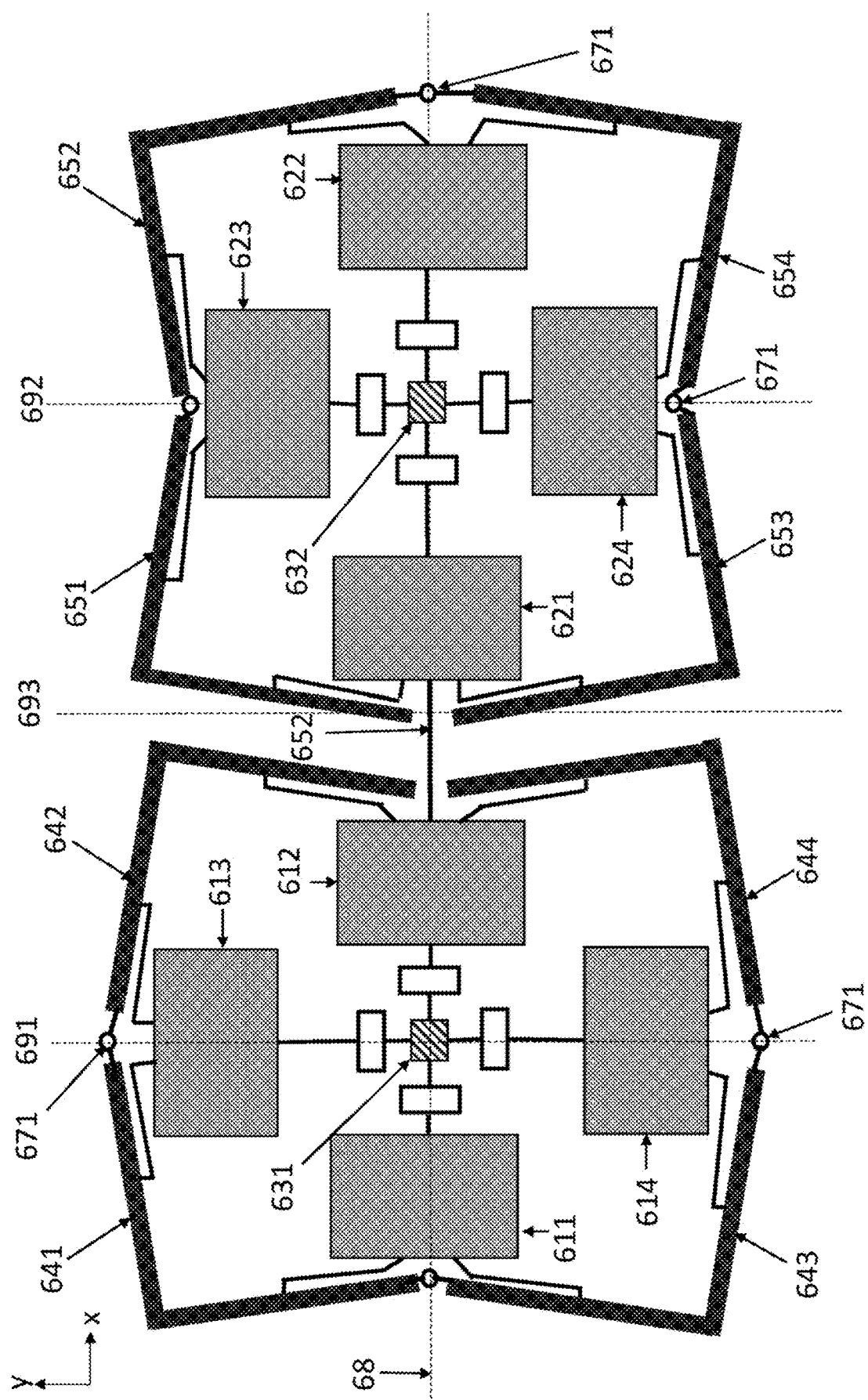
FIG. 6 illustrates alternative synchronization frames.

FIG. 6 illustrates alternative synchronization frames. Reference numbers 611-614, 621-624, 631-632, 68 and 691-693 correspond to reference numbers 511-514, 521-524, 531-532, 58 and 591-593, respectively, in FIG. 5a. The other elements of the gyroscope illustrated in FIG. 6, also correspond to the elements in FIG. 5a, with the exception of the peripheral suspension arrangement.

In FIG. 6, each synchronization frame comprises four substantially L-shaped frame elements connected in series. The ends of each L-shaped frame element are connected to the ends of the adjacent L-shaped frame elements with hinge connection elements. Each hinge connection element allows the L-shaped frame elements which are connected to it to rotate in opposite directions about vertical axes which cross said frame element corners.

The first synchronization frame, which surrounds the first proof mass quartet, now comprises four L-shaped frame elements 641-644. The second synchronization frame, which surrounds the second proof mass quartet, comprises four L-shaped frame elements 651-654. The frame elements are interconnected with hinge connection elements 671.

Each L-shaped frame element has a frame element corner where the two legs of the frame element meet at a substantially orthogonal angle. The L-shaped frame elements may also be called corner elements, and they may form a rectangle in their rest position. The rectangle may be a square.

In their rest position the four L-shaped frame elements 641-644 and 651-654 form a square-shaped frame around each proof mass quartet. But FIG. 6 illustrates a primary oscillation phase where proof mass pairs 611+612 and 623+624 have moved radially closer to their respective quartet center points and the pairs 613+614 and 621+622 have moved radially away from their respective quartet center points. The synchronization frames can flexibly accommodate this oscillation by rotation about a vertical axis, as illustrated in FIG. 6.

The hinge connection elements 671 may be configured to flexibly accommodate the mutual rotation of the connected L-shaped frame elements about a vertical axis. The hinge connection 671 may nevertheless stiffly resist mutual rotation of connected frame elements about any axis within the device plane, and also stiffly resist linear translation of the frame elements in relation to each other. All L-shaped frame elements thereby remain in the same plane and only undergo out-of-plane oscillation in the same manner as the unitary synchronization frames 561 and 562 in FIG. 5.

As in FIG. 5, the first and second synchronization frames may again comprise a central gap where the lateral spring 652 can extend between proof masses 612 and 621. Alternatively, if the lateral spring lies on a different vertical level, the L-shaped frame elements 642 and 644 may also be connected with a hinge connection element, and so too elements 651 and 653. It may also in some cases be possible to integrate a hinge connection element onto the lateral spring 652, so that all parts illustrated in the center of the gyroscope can be in the same vertical plane while still allowing the first and second synchronization frames to flexibly the accommodate the first primary oscillation mode in the manner described above.

When the hinge elements have sufficient vertical thickness to keep all L-shaped frame elements in the same plane, the synchronization frames 641+642+643+644 and 651+652+653+654 can undergo rotational movement about the lateral axis 68 and the first and second transversal axis 691 and 692, respectively, when the gyroscope undergoes angular rotation about the x-axis and/or the y-axis. They can thereby synchronize the x-axis and y-axis secondary oscillation modes in the same manner as frames 561 and 562 which were discussed above.

The synchronization frames illustrated in FIG. 6 can be implemented in combination with any other central or peripheral suspension arrangement presented in this disclosure, but they can only be used when the proof mass quartets are driven to the first primary oscillation mode illustrated in FIG. 2a, not when the quartets are driven to the second primary oscillation mode illustrated in FIG. 3a.

Figure 7:
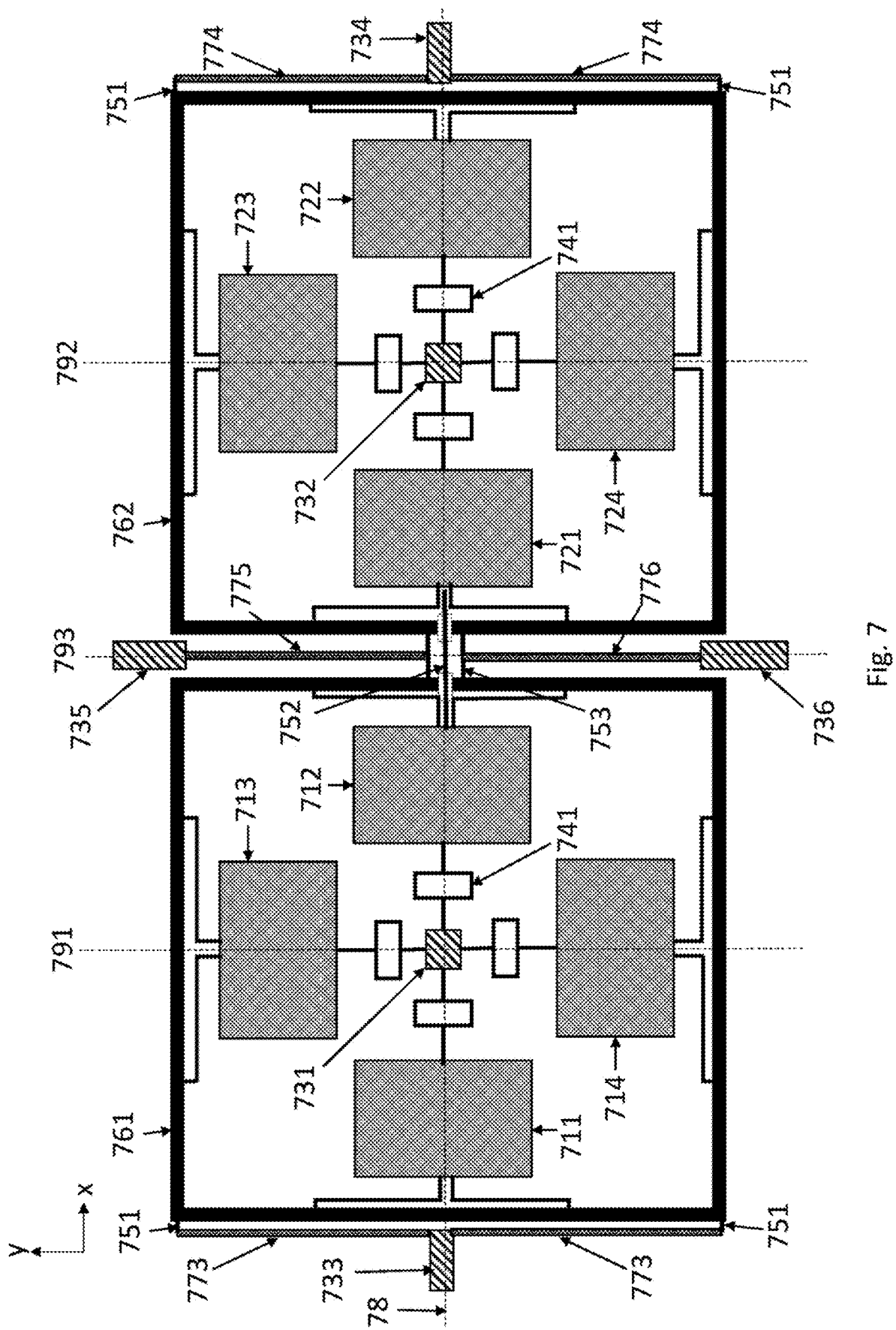
FIG. 7 illustrates a peripheral suspension arrangement.

FIG. 7 illustrates a peripheral suspension arrangement which provides support for the weight of the synchronization frames and the proof masses near the periphery of the gyroscope. Reference numbers 711-714, 721-724, 731-732, 761-762, 78 and 791-793 correspond to reference numbers 511-514, 521-524, 531-532, 561-562, 58 and 591-593, respectively, in FIGS. 5a and 5b.

The gyroscope comprises a first lateral anchor point 733 and a second lateral anchor point 734 on the lateral axis 78, so that the first lateral anchor point 733 is adjacent to the first proof mass 711 in the first proof mass quartet, and the second lateral anchor point 734 is adjacent to the second proof mass 722 in the second proof mass quartet, and the gyroscope further comprises a first transversal anchor point 735 which lies on the third transversal axis 793 on the first side (the upper side in FIG. 7) of the lateral axis 78, and a second transversal anchor point 736 which lies on the third transversal axis 736 on the second side (the lower side in FIG. 7) of the lateral axis 78, The first peripheral suspension arrangement further comprises at least two transversal peripheral suspension springs 773 which in their rest positions extend in opposite transversal directions from the first lateral anchor point 733 to corresponding attachment points on the first synchronization frame 761, and the second peripheral suspension arrangement further comprises at least two transversal peripheral suspension springs 774 which in their rest positions extend in opposite transversal directions from the second lateral anchor point 734 to corresponding attachment points on the second synchronization frame 762.

The gyroscope further comprises one or more first transversal central suspension springs 775 which in their rest positions extend along the third transversal axis 793 from the first transversal anchor point 735 to attachment points on the first and second synchronization frames 761 and 762, and one or more second transversal central suspension springs 776 which in their rest positions extend along the third transversal axis 793 from the second transversal anchor point 736 to attachment points on the first and second synchronization frames 761 and 762. A first end of each transversal peripheral and central suspension spring 773-776 is attached to the corresponding anchor point with an attachment element which is flexible for lateral torsion, and a second end of each transversal suspension spring 773-776 is attached to an attachment point on the corresponding synchronization frame with an attachment element which is flexible for lateral torsion.

An attachment bar 751 may be located at each attachment point. The first and second transversal central suspension springs 775 and 776 may be attached to the first and second synchronization frames 761 and 762 close to the lateral axis, as illustrated in FIG. 7.

Each transversal suspension spring, whether it is peripheral or central, is attached to its anchor point and to the synchronization frames with torsionally flexible elements, such as the attachment bars 751 and 753 illustrated in FIG. 7. These suspension springs thereby support the weight of the synchronization frames 761 and 762 and allow them to move out of the device plane. When the distal ends (the ends which are not attached to the anchor points) of both transversal peripheral suspension springs 773 move in the same out-of-plane direction, they allow the synchronization frame 761 to tilt about the first transversal axis 791. When the distal ends transversal peripheral suspension springs 773 move in opposite out-of-plane directions, they allow the synchronization frame 761 to tilt about the lateral axis 78. The same applies to the other pair of transversal peripheral suspension springs 774 and synchronization frame 762.

The transversal central suspension springs support the weight of the synchronization frames 761 and 762 in the middle. They do not influence the tilting of the synchronization frames 761 and 762 about the lateral axis 78, but they synchronize their tilting about the first and second transversal axes 791 and 792, respectively. The central edges of the first and second synchronization frames 761 and 762 thereby always move in the same out-of-plane direction.

The embodiment illustrated in FIG. 7 can be implemented in combination with any other embodiment illustrated in this disclosure. It can be implemented both for the first primary oscillation mode and for the second primary oscillation mode.

Figure 8:
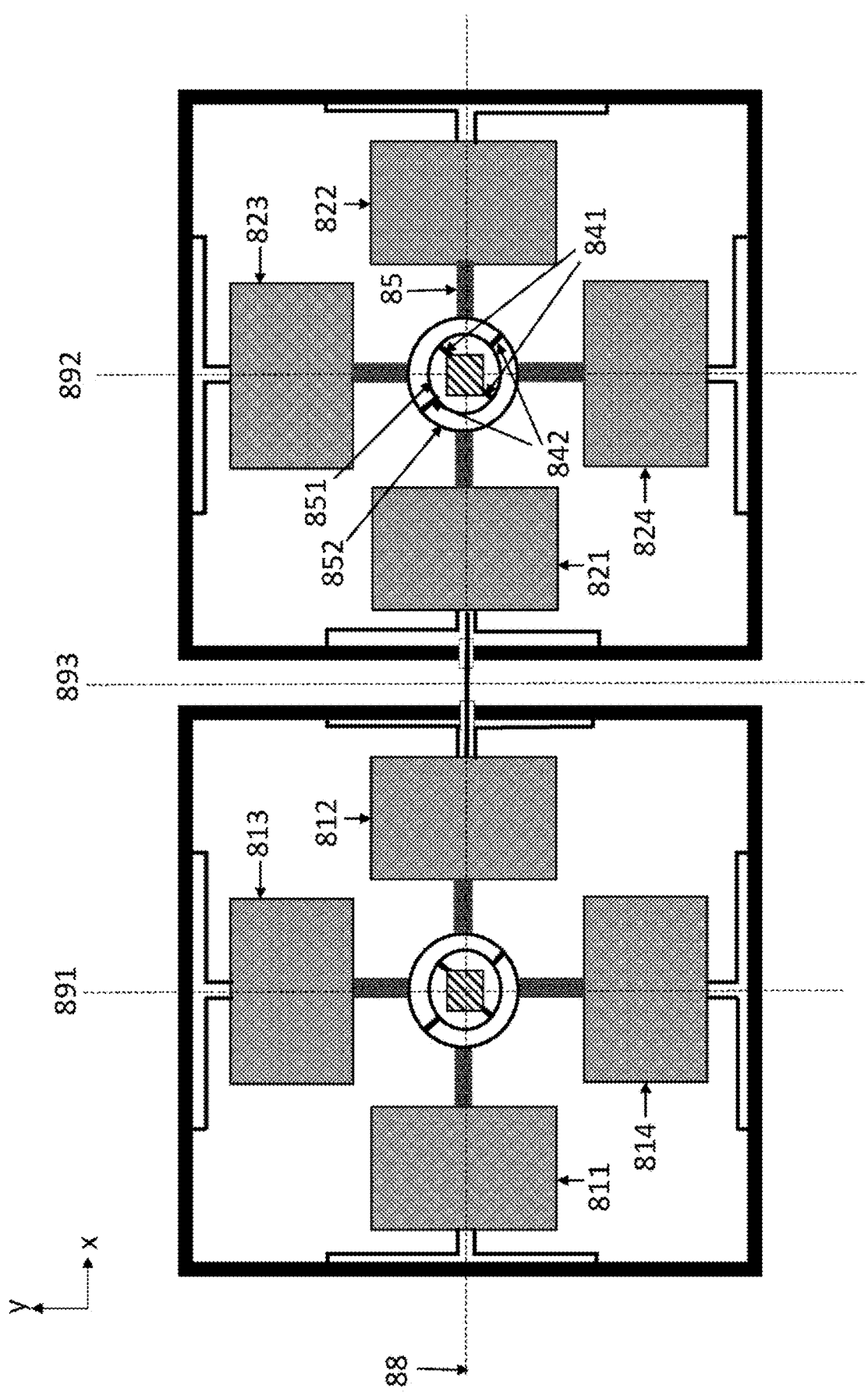
FIG. 8 illustrates a central suspension arrangement.

FIG. 8 illustrates an alternative central suspension arrangement which synchronizes the radial motion of each proof mass quartet. Reference numbers 811-814, 821-824, 88 and 891-893 correspond to reference numbers 511-514, 521-524, 58 and 591-593, respectively, in FIG. 5a. The other elements of the gyroscope illustrated in FIG. 8 also correspond to the elements in FIG. 5a, with the exception of the central suspension arrangement.

In FIG. 8, each central suspension arrangement comprises a gimbal structure which comprises an inner gimbal frame and a concentric outer gimbal frame. The gimbal structure also comprises torsion bars which facilitate gimbal rotation about the lateral axis and the corresponding transversal axis.

In the gimbal structures illustrated in FIG. 8, two inner torsion bars 841 extend in opposite directions from the central anchor point to the inner gimbal frame 851, and two outer torsion bars 842 extend in opposite directions from the inner gimbal frame 851 to the outer gimbal frame 852, so that the outer torsion bars extend in a direction which is perpendicular to the direction of the inner torsion bars. These perpendicular directions may be either lateral/transversal, or diagonal as in FIG. 8.

In FIG. 8, the inner gimbal frame 851 is circular, the outer gimbal frame 852 is circular, and each proof mass in the corresponding proof mass quartet is attached to the outer gimbal frame 852 with an attachment part 85.

FIG. 9 illustrates an alternative central suspension arrangement for synchronizing the radial motion of each proof mass quartet. Reference numbers 911-914, 921-924, 98 and 991-993 again correspond to reference numbers 511-514, 521-524, 58 and 591-593, respectively, in FIG. 5a. The other elements of the gyroscope illustrated in FIG. 8 also correspond to the elements in FIG. 5a, with the exception of the central suspension arrangement.

In FIG. 9, each central suspension arrangement comprises a gimbal structure. The inner gimbal frame is rectangular and the outer gimbal frame is rectangular. The central suspension arrangement further comprises four substantially L-shaped frame elements connected in series, which surround the outer gimbal frame. The ends of each L-shaped frame element are connected to the ends of the adjacent L-shaped frame elements with hinge connection elements. Each hinge connection element allows the L-shaped frame elements which are connected to it to rotate in opposite directions about a vertical axis which crosses said hinge connection element. The central suspension arrangement further comprises at least four connection bars. Each connection bar extends from the outer gimbal frame either to an adjacent L-shaped frame element or to an adjacent hinge connection element. Each proof mass in the corresponding proof mass quartet is attached to an adjacent hinge connection element with an attachment part.

The inner and outer gimbal frames have not been numbered in FIG. 9 for clarity reasons. The inner and outer torsion bars may be arranged laterally and transversally, respectively, as illustrated in FIG. 9. The L-shaped frame elements 971-974 have been numbered in the central suspension arrangement which is centered on the second central anchor point. Hinge connection elements have been illustrated simply as bars, but they may have the same structure as hinge connection elements 671 in FIG. 6. The L-shaped frame elements may also be called corner elements, and they may in their rest position form a rectangular shape, which may be a square shape.

The function of the hinge-connection elements in FIG. 9 may be the same as the function of hinge connection elements 671 in FIG. 6. In other words, each hinge connection element joins together two adjacent L-shaped frame elements and allows them to turn in relation to each other about vertical axes which cross the frame element corners. The turning of the L-shaped frame elements will be discussed in more detail below, with reference to FIG. 11.

The connection bars 961 which extend outward from the outer gimbal frame are numbered in the central suspension arrangement which is centered on the first central anchor point. These connection bars are dimensioned so that they rigidly transmit the turning of the outer gimbal frame to the L-shaped frame elements. The L-shaped frame elements and the outer gimbal frame therefore remain substantially in the same plane even as the proof mass quartet and the inner and outer suspension arrangements rotate out of the xy-plane. Small deviations from this planarity may nevertheless occur, because it may in some cases be preferable to dimension the connection bars 961, or the L-shaped frame elements 971-974, or the hinge connection elements so narrow that they exhibit a little bit of out-of-plane flexibility and bending.

One connection bar 961 may extend from each corner of the outer gimbal frame to the corner of the adjacent L-shaped frame element, as illustrated in FIG. 9. Alternatively, one connection bar may extend from the outer gimbal frame to each hinge connection element, for example so that two connection bars are aligned on the lateral axis on opposite sides of the outer gimbal frame, and two connection bars are aligned on the corresponding transversal axis on opposite sides of the outer gimbal frame (this alternative has not been illustrated). Each proof mass may be attached to the adjacent hinge connection element with an attachment part 952.

FIG. 10 illustrates the operating principle of the gimbal structures illustrated in FIG. 8. The gimbal structure shown on top in FIG. 10 comprises an inner gimbal frame 1051 and an outer gimbal frame 1052, inner torsion bars 1041 between the central anchor point and the inner gimbal frame 1051 and outer torsion bars 1042 between the inner gimbal frame and the outer gimbal frame.

In the oscillation phase where the first and second proof masses in the quartet have moved away from each other on the lateral axis 108, and the third and fourth proof masses have moved towards each other on the transversal axis 109, gimbal frames 1051 and 1052 may assume elliptical shapes which accommodate this movement as illustrated in the middle of FIG. 10. In the phase where the first and second proof masses in the quartet have moved towards each other on the lateral axis 108, and the third and fourth proof masses have moved away from each other on the transversal axis 109, the inner gimbal frame and the outer gimbal frame may also accommodate the movement by assuming an elliptical shape, as illustrated in the bottom part of FIG. 10.

In the first z-axis secondary oscillation mode illustrated in FIGS. 2b and 2c, all proof masses oscillate tangentially in the xy-plane. The inner and outer gimbal frames 1051 and 1052 may assume elliptical shapes along diagonal axes 1081/1082 to accommodate this movement.

The oscillation of the inner and outer gimbal frames between an elliptical and a circular shape also synchronizes the oscillation of the attached proof mass quartet because the potential energy stored in the frames in their elliptical shapes is released as the frame returns to a circular shape and then carried over to the ellipses which are formed in the opposite phase.

The central suspension structures resist the undesired in-plane oscillation modes illustrated in FIGS. 4a and 4b, while the lateral synchronization spring, such as spring 555 in FIG. 5a, will resist the undesired out-of-plane oscillation mode in all embodiments presented in this disclosure.

FIG. 11 illustrates the operating principles of the central suspension structures illustrated in FIG. 9. In this case the rectangular inner and outer gimbal frame may undergo only a small shape transformation due to the movement of the adjacent proof masses, or no transformation at all. Instead, the movement of the proof masses is flexibly accommodated by the system of L-shaped frame elements which surrounds the outer gimbal frame.

The top part of FIG. 11 shows four L-shaped frame elements 971-974 interconnected with four hinge connection elements 951-954. The lower part of FIG. 11 illustrates an oscillation phase where the first and second proof masses in the quartet have moved away from each other on the lateral axis 98, and the third and fourth proof masses have moved towards each other on the transversal axis 99. The L-shaped frame elements may also be called corner elements, wherein each corner element comprises two legs which meet at the frame element corner at a substantially perpendicular angle. The corner elements may form a rectangular shape in their rest positions. The shape may be a square.

The movement of the L-shaped frame elements 971-974 follows the same principle as the movement of frame elements 641-644 and 651-654 in FIG. 6. First and fourth L-shaped frame elements 971 and 974 have both turned around hinge connection element 951 so that the angle formed by the arms of the hinge-connection element becomes obtuse toward the center point where the lateral axis 98 crosses the transversal axis 99. The second and third L-shaped frame elements 972 and 973 have also both turned so that the angle formed by their hinge connection element 952 becomes obtuse toward the center point. The angles formed by hinge connection elements 953 and 954, on the other hand, are obtuse in the opposite direction, away from the center point. In the opposite oscillation phase, which is not illustrated, the angle formed by each hinge connection element will be obtuse in the opposite direction. Many different hinge connection elements could be used, and the illustration in FIG. 11 is only schematic. As before, the gimbal structure which surrounds the center point will resist the undesired in-plane oscillation modes illustrated in FIGS. 4a-4b as well as all other kinds of in-plane modes, like e.g. linear common-mode of any axis.

The central suspension arrangements illustrated in FIGS. 8 and 9 can be combined with any peripheral suspension arrangement illustrated in this disclosure which is suitable for the first primary oscillation mode illustrated in FIG. 2a. Additional proof masses may be added to the gyroscope for facilitating improved and easier detection of the z-axis secondary mode. The gyroscope may further comprise a third proof mass quartet within the first synchronization frame and a fourth proof mass quartet within the second synchronization frame. The four proof masses which form the third proof mass quartet may in their rest positions be symmetrically arranged around the first quartet center point, and the four proof masses which form the fourth proof mass quartet may in their rest positions be symmetrically arranged around the second quartet center point.

First and second proof masses in the third proof mass quartet may be aligned on a first diagonal axis which crosses the lateral axis and the first transversal axis at the first quartet center point at an angle of 45 degrees. Third and fourth proof masses in the third proof mass quartet may be aligned on a second diagonal axis which is orthogonal to the first diagonal axis and crosses the first quartet center point.

First and second proof masses in the fourth proof mass quartet may be aligned on a third diagonal axis which crosses the lateral axis and the second transversal axis at the second quartet center point at an angle of 45 degrees. Third and fourth proof masses in the fourth proof mass quartet may be aligned on a fourth diagonal axis which is orthogonal to the third diagonal axis and crosses the second quartet center point.

One or more transversal corner springs extend to each proof mass in the third proof mass quartet from an adjacent proof mass in the first proof mass quartet which is aligned on the lateral axis. One or more lateral corner springs extend to each proof mass in the third proof mass quartet from an adjacent proof mass in the first proof mass quartet which is aligned on the first transversal axis.

One or more transversal corner springs extend to each proof mass in the fourth proof mass quartet from an adjacent proof mass in the second proof mass quartet which is aligned on the lateral axis. One or more lateral corner springs extend to each proof mass in the fourth proof mass quartet from an adjacent proof mass in the second proof mass quartet which is aligned on the second transversal axis.

Figure 12A:
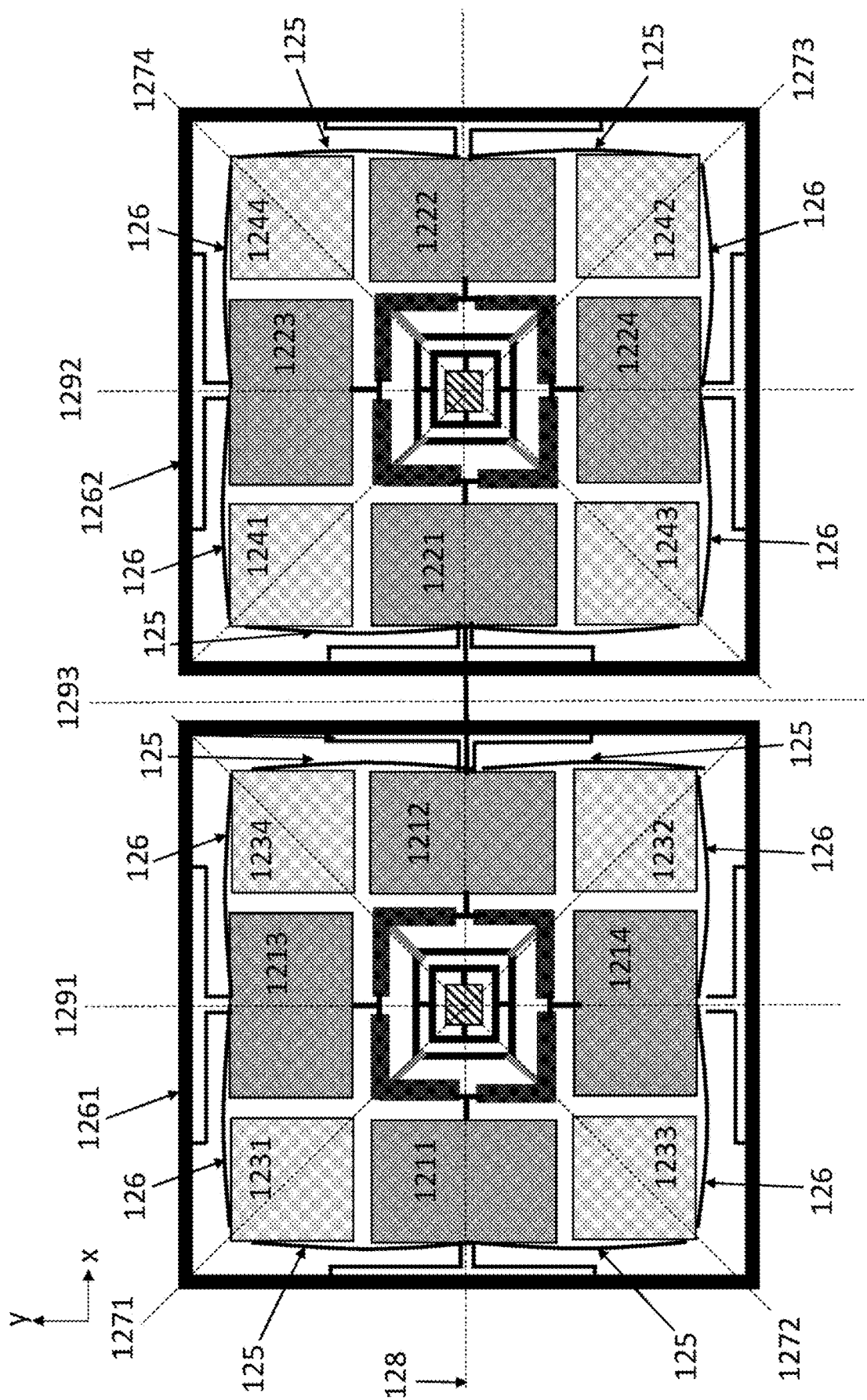
FIGS. 12a-12b illustrate a gyroscope with two proof mass quartets and two detection mass quartets.

FIG. 12a illustrates a gyroscope with two proof mass quartets and two detection mass quartets. Reference numbers 1211-1214, 1221-1224, 1261-1262, 128 and 1291-1293 correspond to reference numbers 511-514, 521-524, 561-562, 58 and 591-593, respectively, in FIGS. 5a and 5b. Insofar as a direct counterpart exists in the preceding figures, the other elements drawn in FIG. 12a also correspond to the elements of preceding embodiments.

The gyroscope illustrated in FIG. 12a differs from previous embodiments in that a first detection mass quartet 1231-1234 and a second detection mass quartet 1241-1244 has been added. Detection masses 1231-1232 are aligned on a first diagonal axis 1271 and detection masses 1233-1234 are aligned on a second diagonal axis 1272. Proof masses 1241-1242 are aligned on a third diagonal axis 1273 and proof masses 1243-1244 are aligned on a second diagonal axis 1274. In other words, the proof masses in the first and second detection mass quartets may be placed near the corners of the first and second synchronization frames, so that each proof mass in the first and second detection mass quartets occupies one corner.

Together, the first proof mass quartet and the first detection mass quartet may cover an approximately rectangular area, which may be quadratic, as in FIG. 12a. The second proof and detection mass quartets may likewise cover a rectangular area. However, the shapes of the individual proof and detection masses in the xy-plane need not necessarily be rectangular. Any suitable shape may be used. The sizes of the detection masses may be adjusted relative to the sizes of the proof masses by varying their shapes in the xy-plane.

Detection masses 1231-1234 and 1241-1244 may be used to detect the z-axis secondary oscillation mode in a linear manner. This is facilitated by the corner springs 125 and 126. A transversal corner spring 125 extends from the first proof mass 1211 in the first proof mass quartet to both the first (1231) and the third (1233) detection masses in the first detection mass quartet, as illustrated in FIG. 12a. A transversal corner spring 125 also extends from the second proof mass 1212 in the first proof mass quartet to both the second (1232) and the fourth (1234) detection masses in the first detection mass quartet. A lateral corner spring 126 extends from the third proof mass 1213 in the first proof mass quartet to both the first (1231) and the fourth (1234) detection masses in the first detection mass quartet. A lateral corner spring 126 also extends from the fourth proof mass 1214 in the first proof mass quartet to both the second (1232) and the third (1233) detection masses in the first detection mass quartet. Lateral and transversal corner springs are arranged in the same manner between the masses of the second proof mass quartet and the second detection mass quartet, as illustrated in FIG. 12a.

When the proof masses in the first and second proof mass quartet oscillate tangentially in the z-axis secondary mode, this tangential oscillation is transmitted to the detection masses by the lateral and transversal corner springs. Since the momentum imparted by the corner springs in the lateral and transversal directions is equal (or very close to equal), the detection masses move in radial oscillation along the diagonal axes, in the manner illustrated in FIG. 12b. Unlike the tangential oscillation of the proof masses, this radial oscillation of the detection masses does not contain a component of in-plane rotation. It may therefore be preferable to detect the secondary z-axis oscillation mode with sense transducers which measure the oscillation of the detection mass quartets.

The detection masses may be fixed to the first and second synchronization frames, respectively, so that they move with the frame when the gyroscope undergoes angular rotation about the x-axis or the y-axis. However, the detection masses are not necessarily needed for detecting x-axis and y-axis secondary modes, so they may alternatively be disconnected from the synchronization frames and their movement may be restricted only to the xy-plane. The benefit of disconnecting them is that z-axis secondary mode measurements are less likely to be disturbed the x- and y-axis secondary modes. It is also easier to design sense transducers around the detection masses if they only undergo motion along one axis in the xy-plane.

Each detection mass may be suspended from a diagonal anchor point (not illustrated) which lies on the diagonal axis on which the detection mass is aligned. The diagonal anchor point may, for example, be located within an opening formed in said detection mass. The transversal corner springs 125 and the lateral corner springs 126 may exhibit sufficient out-of-plane flexibility to accommodate the out-of-plane motion of the first and second proof mass quartets in the x-axis or y-axis secondary oscillation modes while the detection mass quartets remain within the xy-plane.

Figure 12B:
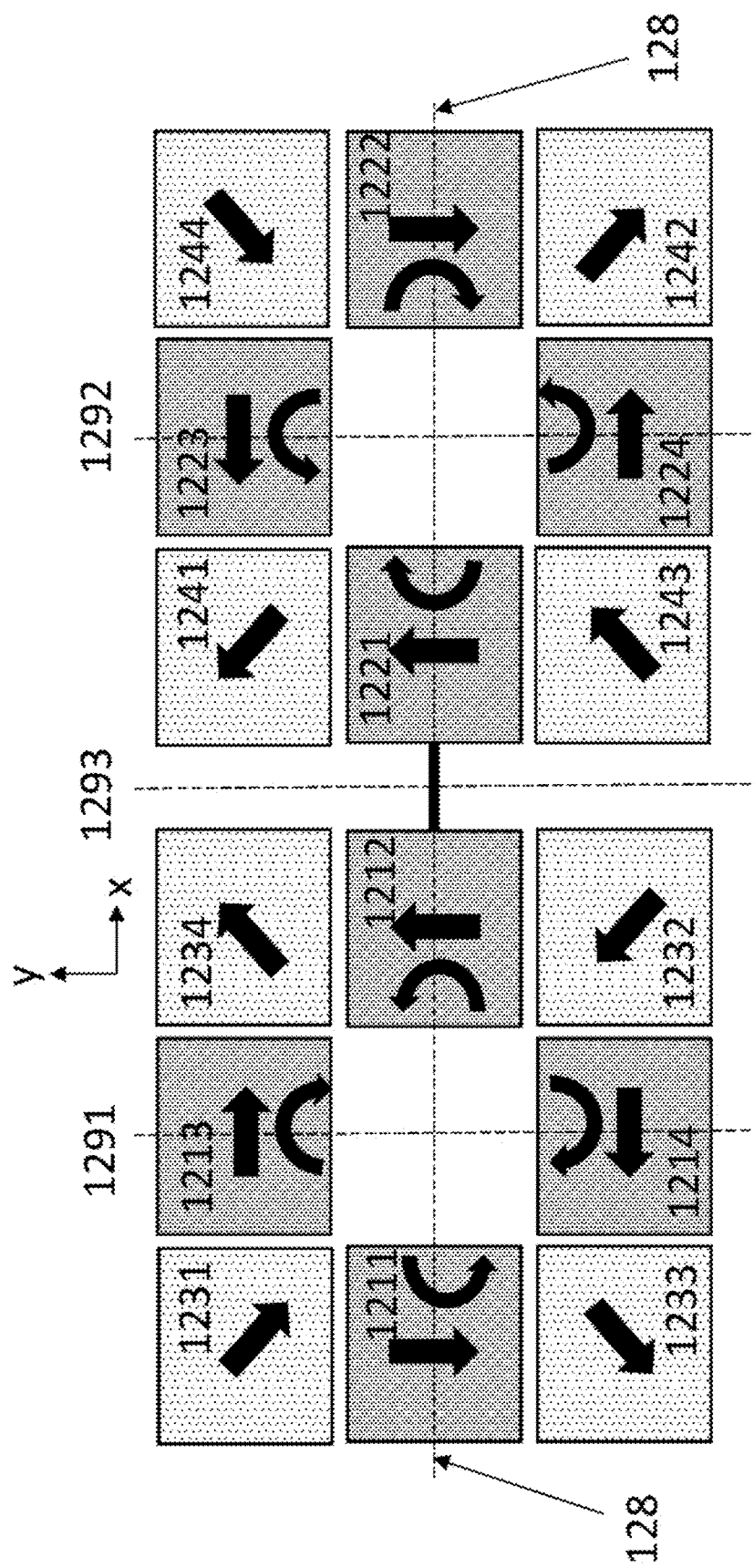

Capacitive sense transducers may be implemented either within an opening in one or more proof masses in the third and fourth proof mass quartets, or adjacent to one or more proof masses in the third and fourth proof mass quartets, to detect the radial z-axis secondary oscillation modes illustrated in FIG. 12b. Detection mass quartets can be implemented in the manner described above in any of the embodiments described in this disclosure.

The detection masses 1231-1234 and 1241-1244 can be implemented in combination with any central or peripheral suspension arrangement illustrated in this disclosure, and they can be used both with the first primary oscillation mode illustrated in FIG. 2a, and with the second primary oscillation mode illustrated in FIG. 3a. If the second primary oscillation mode is used, the detection masses have to be suspended for tangential oscillation instead of radial.

A peripheral synchronization structure may be used to synchronize the oscillation of the first and second synchronization frames. As described above, the gyroscope may comprises a first lateral anchor point and a second lateral anchor point on the lateral axis, so that the first lateral anchor point is adjacent to the first proof mass in the first proof mass quartet, and the second lateral anchor point is adjacent to the second proof mass in the second proof mass quartet. The gyroscope may further comprise a first transversal anchor point which lies on the third transversal axis on the first side of the lateral axis, and a second transversal anchor point which lies on the third transversal axis on the second side of the lateral axis The gyroscope may also comprise a first lateral seesaw on the first side of the lateral axis and a second lateral seesaw on the second side of the lateral axis. The first lateral seesaw may be attached to the first transversal anchor point with a torsion element, and the second lateral seesaw may be attached to the second transversal anchor point with a torsion element.

The first lateral seesaw may be attached to the first synchronization frame with a torsion bar on the first transversal axis. The first lateral seesaw may be attached to the second synchronization frame with a torsion bar on the second transversal axis. The second lateral seesaw may be attached to the first synchronization frame with a torsion bar on the first transversal axis. The second lateral seesaw may be attached to the second synchronization frame with a torsion bar on the second transversal axis.

Figure 13A:
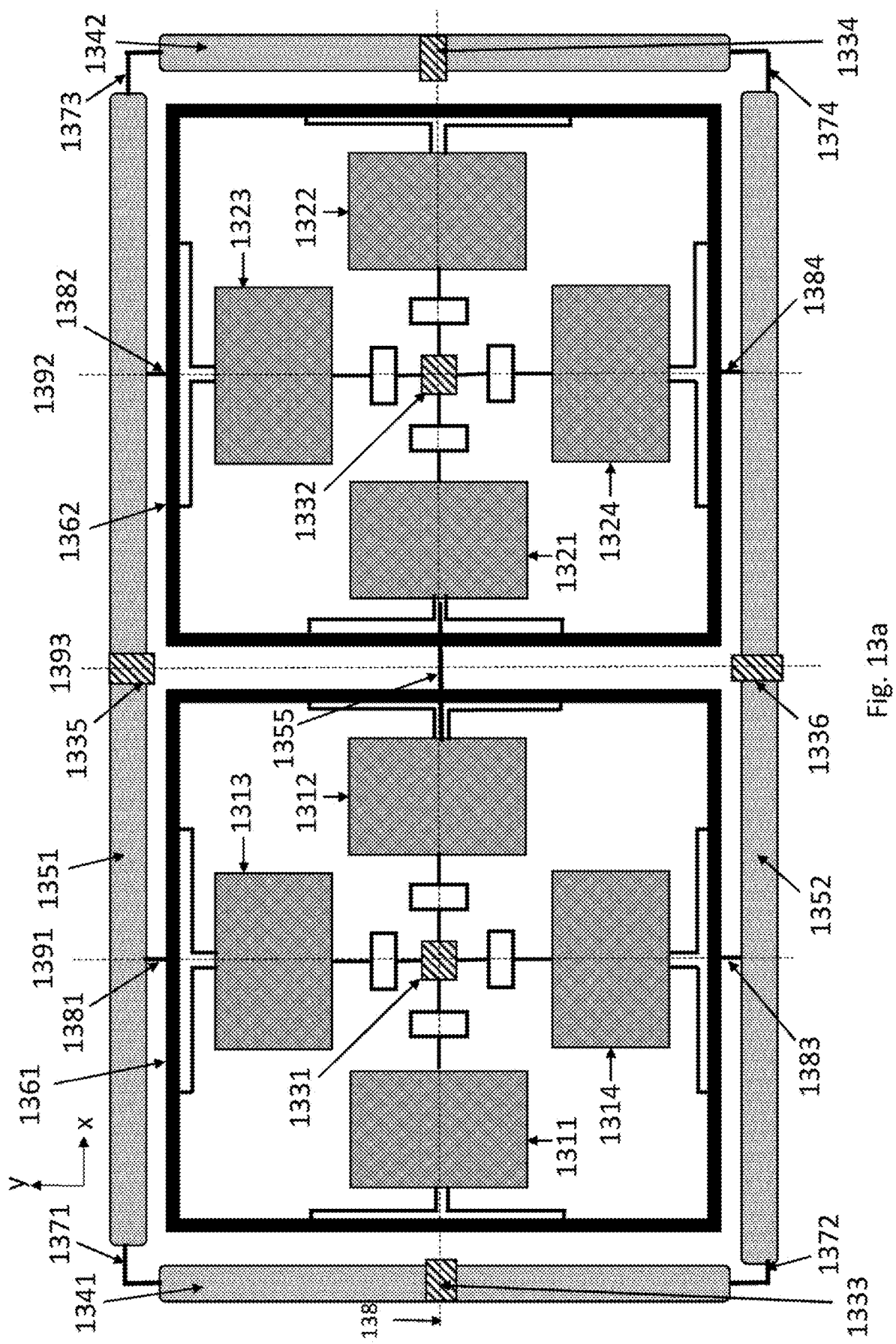
FIG. 13a illustrates a peripheral suspension arrangement.

FIG. 13a illustrates a gyroscope with a peripheral suspension arrangement which provides support for the weight of the synchronization frames and the proof masses near the periphery of the gyroscope. Reference numbers 1311-1314, 1321-1324, 1331-1332, 1355, 1361-1362, 138, 1391-1393 correspond to reference numbers 511-514, 521-524, 531-532, 555, 561-562, 58, 591-593, respectively, in FIGS. 5a and 5b. Reference numbers 1333-1336 correspond to reference numbers 733-736 in FIG. 7. The peripheral suspension arrangement comprises a first lateral seesaw 1351 on a first side of the lateral axis 138, which is in this case on the upper side of the figure. A second lateral seesaw 1352 is on the second side of the lateral axis 138, in this case on the lower side of the figure. The first seesaw 1351 is attached to the first transversal anchor point 1335 with a torsion element (not illustrated in FIG. 13, but visible in FIG. 14) which allows the first lateral seesaw 1351 to rotate about the third transversal axis 1393. Similarly, the second lateral seesaw 1352 is attached to the second transversal anchor point 1336 with a torsion element (not illustrated in FIG. 13, but visible in FIG. 14) which allows the second seesaw 1352 to rotate about the third transversal axis 1393.

The first lateral seesaw 1351 is attached to the first synchronization frame 1361 with a torsion bar 1381 on the first transversal axis 1391, and to the second synchronization frame 1362 with a torsion bar 1382 on the second transversal axis 1392. Similarly, the second lateral seesaw 1352 is attached to the first synchronization frame 1361 with a torsion bar 1383 on the first transversal axis 1391, and to the second synchronization frame 1362 with a torsion bar 1384 on the second transversal axis 1392.

The torsionally pliant attachments of the first and second lateral seesaws 1351 and 1352 allow these seesaws to undergo tilting oscillation back and forth about the third transversal axis 593. Furthermore, the desired secondary oscillation in response to rotation about the axis involves out-of-plane movement where the proof mass pairs formed by the third and fourth proof masses in each proof mass quartet oscillate out-of-plane, so that proof mass 1313 moves in the positive z-direction when proof mass 1323 moves in the negative z-direction and vice versa. Proof mass 1314 correspondingly moves in the negative z-direction when proof mass 1324 moves in the positive z-direction, and vice versa.

The upper edge of the first synchronization frame 1361 in FIG. 13a will thereby also move in the positive z-direction when the upper edge of the second synchronization frame 1362 moves in the negative z-direction, and vice versa. And the lower edge of the first synchronization frame 1361 in FIG. 13a will move in the negative z-direction when the lower edge of the second synchronization frame 1362 moves in the positive z-direction, and vice versa. This motion can be effectively synchronized with the lateral seesaws 1351 and 1352 which will push the edge of one synchronization frame edge upward as it pulls the edge of the other downward.

Optionally, this synchronization can be improved further by connecting the two lateral seesaws to each other. The gyroscope may comprise a first transversal seesaw which is attached to the first lateral anchor point with a torsion element, and a second transversal seesaw which is attached to the second lateral anchor point with a torsion element. A first end of the first transversal seesaw may be attached to a first end of the first lateral seesaw. A second end of the first transversal seesaw may be attached to a first end of the second lateral seesaw. A first end of the second transversal seesaw may be attached to a second end of the first lateral seesaw. A second end of the second transversal seesaw may be attached to a second end of the second lateral seesaw.

Figure 13B:
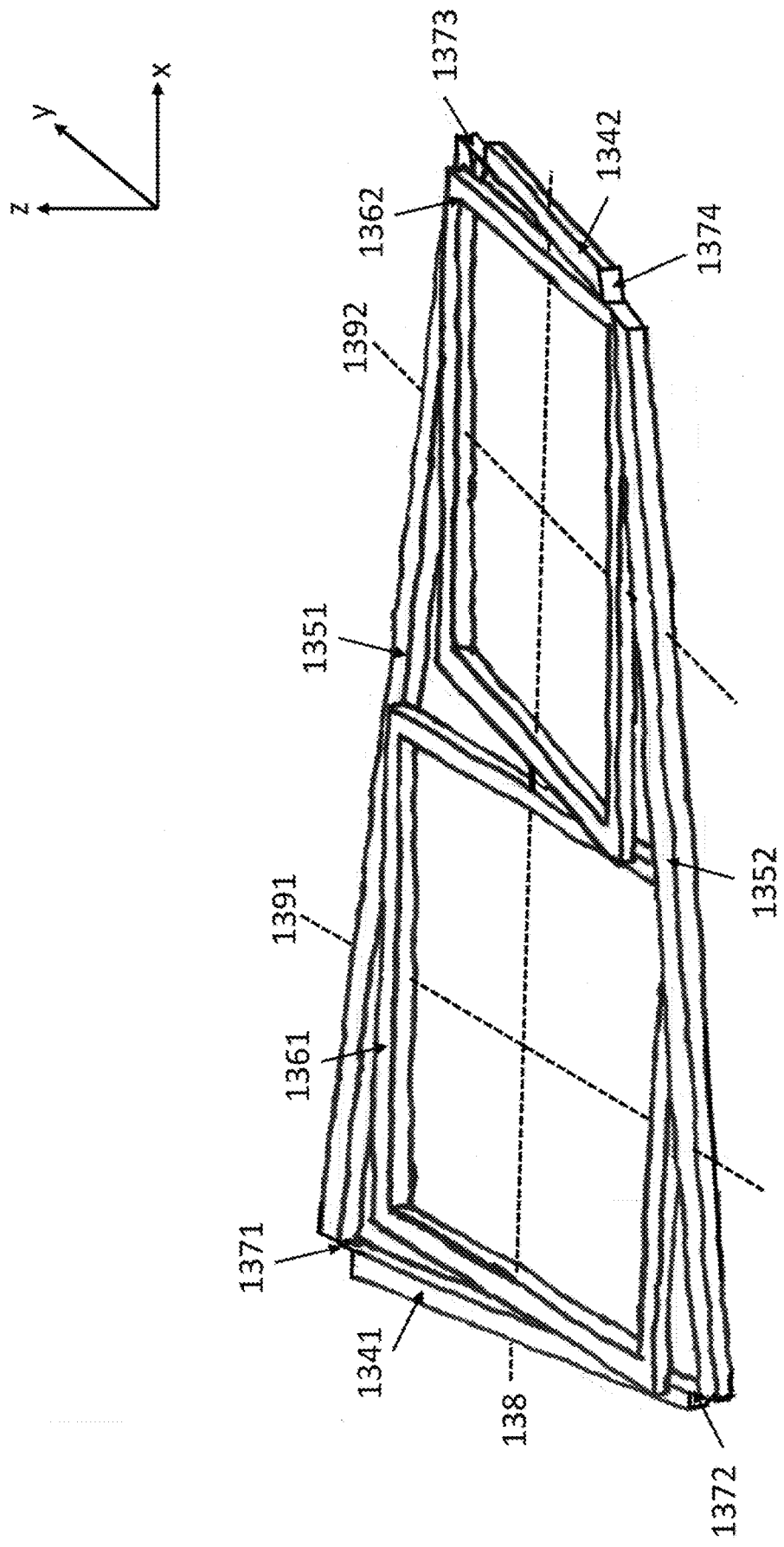
FIG. 13b illustrates the movement of the elements in FIG. 13a in the x-axis secondary oscillation mode.
Figure 13C:
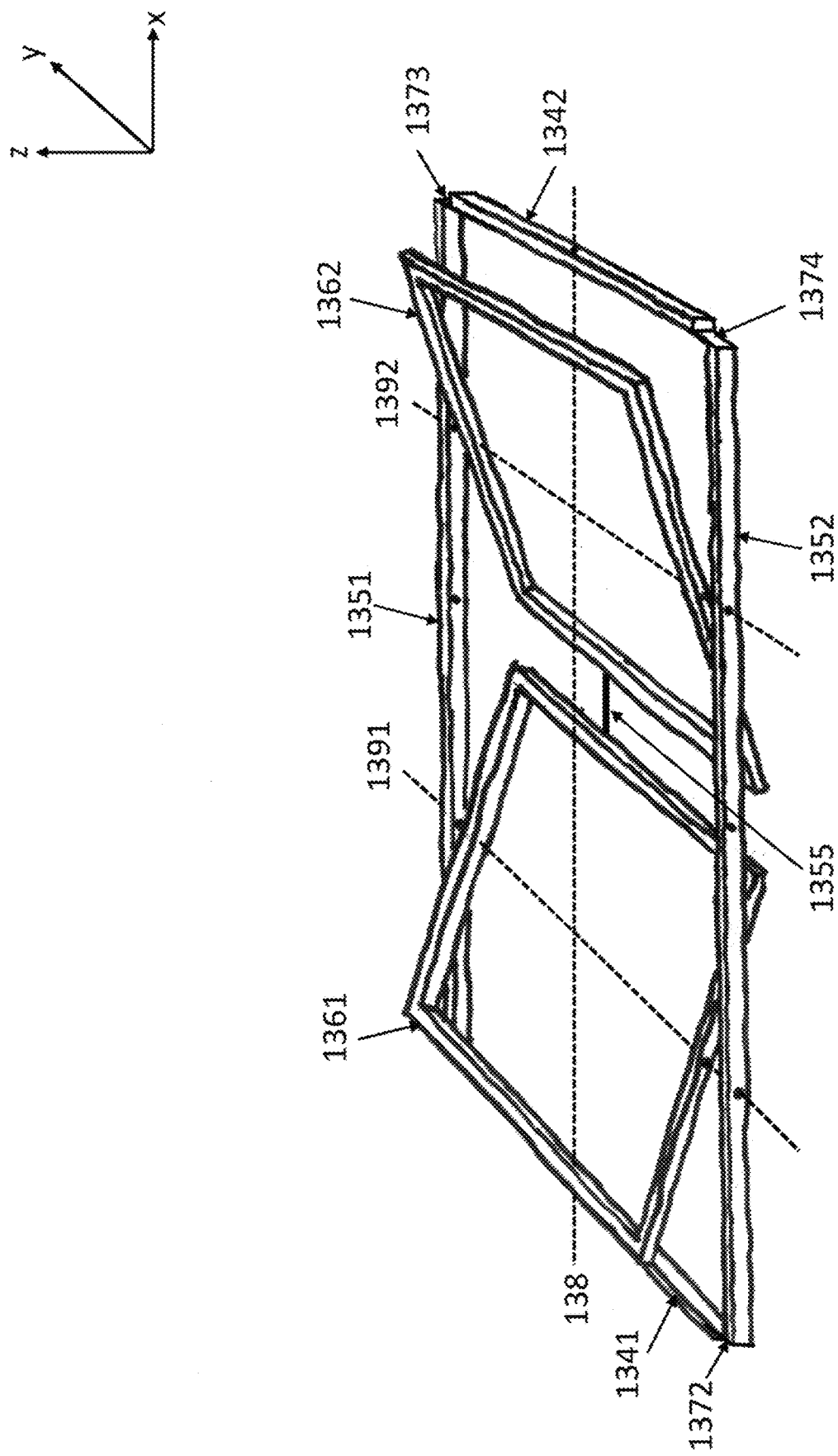
FIG. 13c illustrates the movement of the elements in FIG. 13a in the y-axis secondary oscillation mode.
Figure 14:
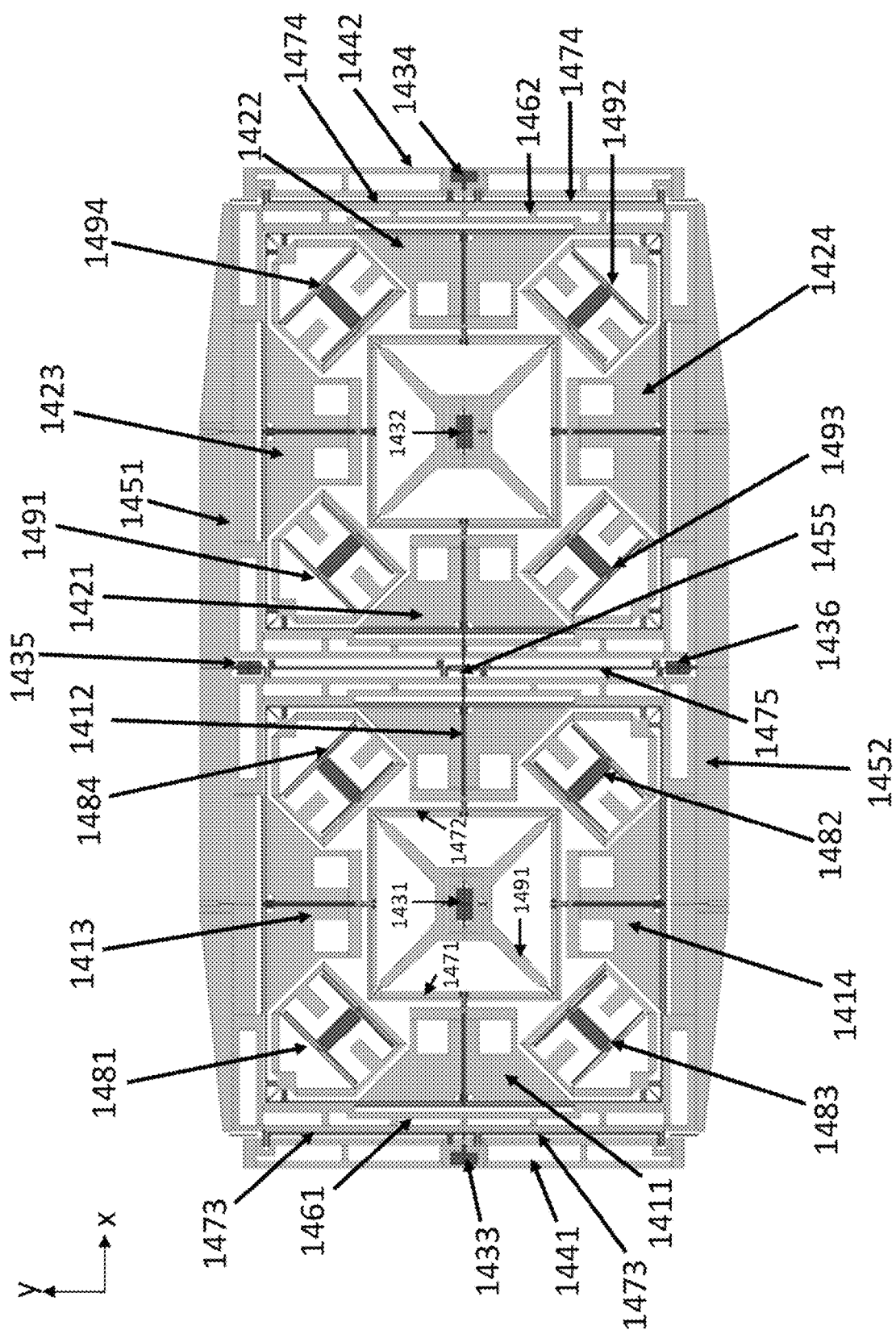
FIGS. 14 and 15 illustrate a more detailed gyroscope structure.

The gyroscope in FIG. 13a comprises a first transversal seesaw 1341 attached to the first lateral anchor point 1333 with a torsion element (not illustrated in FIG. 13, but visible in FIG. 14), and a second transversal seesaw 1342 attached to the second lateral anchor point 1334 attached to the first transversal anchor point 1335 with a torsion element (not illustrated in FIG. 13, but visible in FIG. 14). These torsion elements allow the first and second transversal seesaws to rotate about the lateral axis 138.

As explained above, the first end of the first lateral seesaw 1351 (which may for example be its left end in FIG. 13a) will move in the positive z-direction when the first end of the second lateral seesaw 1352 (again, its left side) moves in the negative z-direction. The second ends of the first and second lateral seesaws (their right ends in FIG. 13a) will correspondingly always be on opposite sides of the xy-plane. The first and second transversal seesaws can synchronize this motion when the first end of the first transversal seesaw 1341 (which may for example be its upper end in FIG. 13a) is connected to the first end of the first lateral seesaw 1351, and the second end of the first transversal seesaw 1341 (its lower end in FIG. 13a) is connected to the first end of the second lateral seesaw 1352. As illustrated in FIG. 13a, the first (upper) end of the second transversal seesaw 1342 may correspondingly be connected to the second end of the first lateral seesaw 1351, and the second (lower) end of the second transversal seesaw 1342 may be connected to the second end of the second lateral seesaw 1352. The connection elements 1371-1374 which connect the seesaws to each other should to some extent also be torsionally pliable, so that they allow at least some twisting.

The torsionally pliant attachments of the first and second transversal seesaws 1341 and 1342 allow these seesaws to undergo tilting oscillation back and forth about the lateral axis 138 in anti-phase, which synchronizes the anti-phase oscillation of the lateral seesaws 1351 and 1352 about the third transversal axis, and thereby the anti-phase oscillation of the first and second synchronization frames 1361 and 1362. This synchronization strengthens the secondary oscillation modes of the proof mass quartets in response to rotation about the x-axis and rejects undesired in-phase oscillation of the lateral seesaws 1351 and 1352. The secondary oscillation modes of the proof mass quartets in response to rotation about the y-axis is synchronized primarily by the lateral synchronization spring 1355, as described above.

The peripheral synchronization structure illustrated in FIG. 13a can be implemented in combination with any central or peripheral suspension arrangement presented in this disclosure, and it can be used both when the proof mass quartets are driven to the first primary oscillation mode illustrated in FIG. 2a and when the quartets are driven to the second primary oscillation mode illustrated in FIG. 3a.

FIG. 13b illustrates three-dimensionally the movement of the elements in FIG. 13a in the x-axis secondary oscillation mode (compare FIGS. 2b and 3b). The proof masses and central suspension arrangements have been omitted for clarity, and the magnitude of the oscillation amplitude (in relation to the dimensions of the peripheral suspension and synchronization arrangements) has been greatly exaggerated for illustrative purposes. As seen in the figure, the first and second synchronization frames 561 and 562 oscillate in opposite phases about the lateral axis 58. The lateral seesaws 1351-1352 and the transversal seesaws 1341-1342 promote this phase relationship.

FIG. 13c illustrates three-dimensionally the movement of the elements in FIG. 13a in the y-axis secondary oscillation mode (compare FIGS. 2b and 3b). Again, the magnitude of the oscillation amplitude has been greatly exaggerated for illustrative purposes. As seen in the figure, the first and second synchronization frames 561 and 562 oscillate in opposite phases about the first and second transversal axes 591 and 592, respectively. The lateral synchronization spring 1355 promotes this phase relationship.

Figure 15:
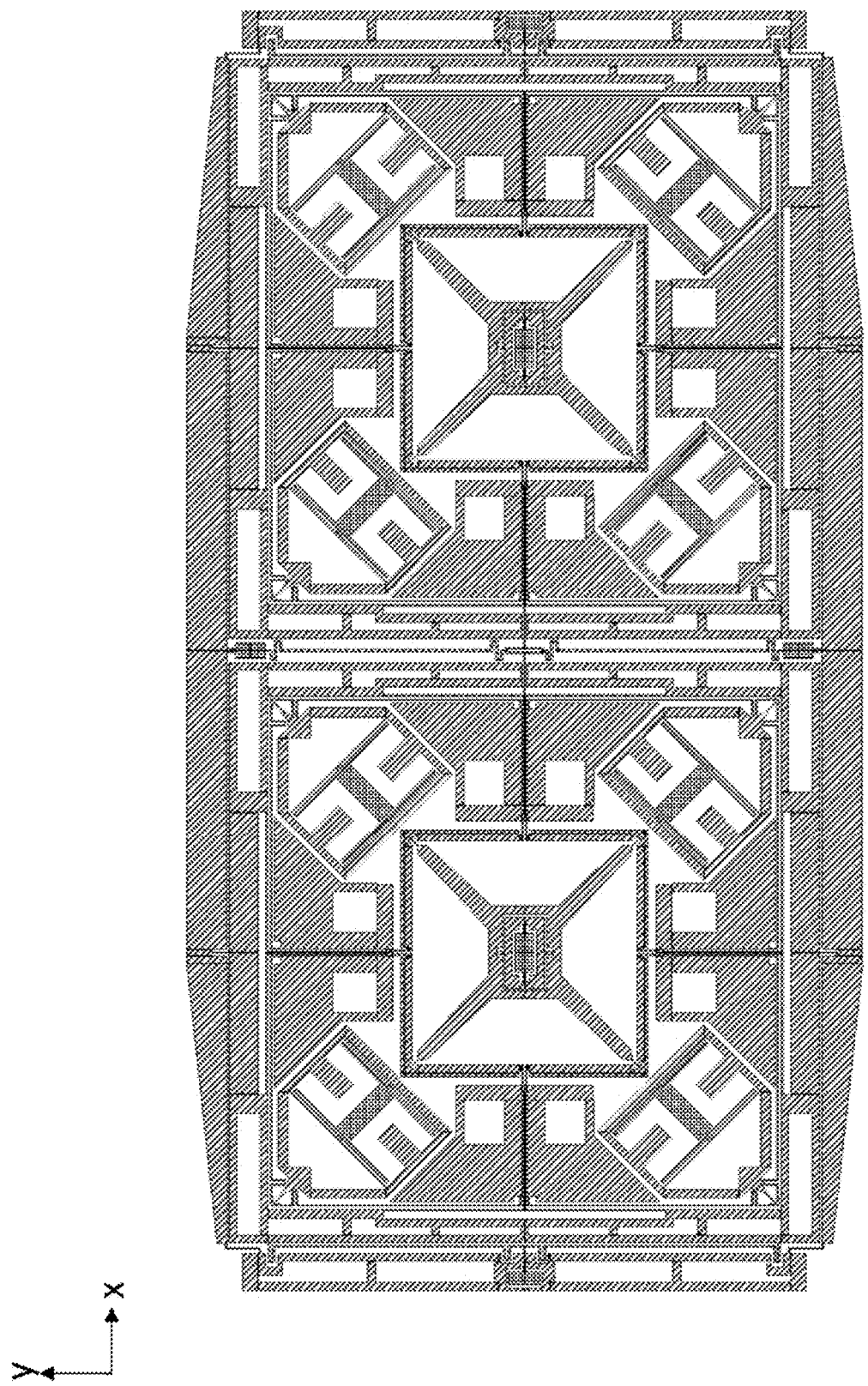

FIG. 14 illustrates an example of a gyroscope structure where some of the embodiments described above have been implemented. Reference numbers 1411-1414, 1421-1424, 1431-1436, 1441-1442, 1451-1452, 1455, 1461-1462 correspond to reference numbers 1311-1314, 1321-1324, 1331-1336, 1341-1342, 1351-1352, 1355 and 1361-1362, respectively, in FIG. 13. Reference numbers 1481-1484 and 1491-1494 correspond to reference numbers 1231-1234 and 1241-1244, respectively, in FIGS. 12a and 12b. Reference numbers 1471-1472 correspond to reference numbers 971-972, respectively, in FIG. 9. Reference number 1491 corresponds to reference number 961 in FIG. 9. Reference numbers 1473, 1474 and 1475 correspond to reference number 773, 774 and 775, respectively, in FIG. 7. FIG. 15 shows a similar example structure without reference numbers.

FIG. 16 illustrates an example structure where drive and sense transducers have also been implemented. Reference numbers 1611-1614, 1621-1624, 1681-1684 and 1691-1694 correspond to reference numbers 1411-1414, 1421-1424, 1481-1484 and 1491-1494, respectively, in FIG. 14.

The invention claimed is:

1. A microelectromechanical gyroscope comprising:
a first proof mass quartet which in its rest position lies in a device plane and an adjacent second proof mass quartet which in its rest position lies in the device plane, with a corresponding first quartet center point and a corresponding second quartet center point which lie on a lateral axis in the device plane,
wherein the four proof masses which form the first proof mass quartet are in their rest positions symmetrically arranged around the first quartet center point where the lateral axis crosses a first transversal axis orthogonally in the device plane, and the four proof masses which form the second proof mass quartet are in their rest position symmetrically arranged around the second quartet center point where the lateral axis crosses a second transversal axis orthogonally in the device plane, and the gyroscope further comprises a third transversal axis which crosses the lateral axis substantially halfway between the first quartet center point and the second quartet center point,
wherein the first and second proof masses in both the first and the second proof mass quartet are aligned on the lateral axis in their rest position, and third and fourth proof masses in the first proof mass quartet are aligned on the first transversal axis in their rest position, and third and fourth proof masses in the second proof mass quartet are aligned on the second transversal axis in their rest position, and the rest positions of the first, second, third and fourth proof masses in relation to the corresponding quartet center point are the same in both the first and the second quartet, so that the third proof masses in both proof mass quartets are located on a first side of the lateral axis, and the fourth proof masses in both proof mass quartets are located on a second side of the lateral axis, and the second proof mass in the first proof mass quartet and the first proof mass in the second proof mass quartet are adjacent to each other on opposing sides of the third transversal axis,
wherein the gyroscope comprises a first central anchor point located at the first quartet center point and a second central anchor point located at the second quartet center point,
wherein the gyroscope further comprises one or more drive transducers for setting the first and second proof mass quartets into primary oscillating motion, and one or more sense transducers for detecting secondary oscillating motion of the first and second proof mass quartets which is induced by the Coriolis force if the gyroscope undergoes angular rotation,
wherein the gyroscope further comprises a suspension arrangement for suspending the first and second proof mass quartets from the central anchor points, wherein the suspension arrangement is configured to accommodate the primary and secondary oscillating motion of the first and second proof mass quartets
wherein the suspension arrangement comprises a first central suspension arrangement centred around the first quartet center point inside the first proof mass quartet and a second central suspension arrangement centred around the second quartet center point inside the second proof mass quartet, wherein each central suspension arrangement flexibly facilitates radial oscillation and tangential in-plane and out-of-plane oscillation of each proof mass, wherein the suspension arrangement further comprises a first peripheral suspension arrangement centred around the first quartet center point outside of the first proof mass quartet, and a second peripheral suspension arrangement centred around the second quartet center point outside of the second proof mass quartet, and the first peripheral suspension arrangement comprises a first synchronization frame, and the second peripheral suspension arrangement comprises a second synchronization frame, and each synchronization frame surrounds the corresponding proof mass quartet, and each proof mass is coupled to the surrounding synchronization frame with one or more frame suspension springs, wherein the gyroscope further comprises a lateral synchronization spring which extends on the lateral axis from the second proof mass in the first proof mass quartet to the first proof mass in the second proof mass quartet.

2. The microelectromechanical gyroscope according to claim 1, wherein each synchronization frame comprises four substantially L-shaped frame elements connected in series, wherein the ends of each L-shaped frame element are connected to the ends of the adjacent L-shaped frame elements with hinge connection elements, wherein each hinge connection element allows the L-shaped frame elements which are connected to it to rotate in opposite directions about vertical axes which cross said frame element corners.

3. The microelectromechanical gyroscope according to claim 1, wherein the gyroscope further comprises a first lateral anchor point and a second lateral anchor point on the lateral axis, so that the first lateral anchor point is adjacent to the first proof mass in the first proof mass quartet, and the second lateral anchor point is adjacent to the second proof mass in the second proof mass quartet, and the gyroscope further comprises a first transversal anchor point which lies on the third transversal axis on the first side of the lateral axis, and a second transversal anchor point which lies on the third transversal axis on the second side of the lateral axis, wherein the first peripheral suspension arrangement further comprises at least two transversal peripheral suspension springs which in their rest positions extend in opposite transversal directions from the first lateral anchor point to corresponding attachment points on the first synchronization frame, and the second peripheral suspension arrangement further comprises at least two transversal peripheral suspension springs which in their rest positions extend in opposite transversal directions from the second lateral anchor point to corresponding attachment points on the second synchronization frame, wherein the gyroscope further comprises one or more first transversal central suspension springs which in their rest positions extend along the third transversal axis from the first transversal anchor point to attachment points on the first and second synchronization frames, and one or more second transversal central suspension springs which in their rest positions extend along the third transversal axis from the second transversal anchor point to attachment points on the first and second synchronization frames, and a first end of each transversal peripheral and central suspension spring is attached to the corresponding anchor point with an attachment element which is flexible for lateral torsion, and a second end of each transversal suspension spring is attached to the corresponding attachment point with an attachment element which is flexible for lateral torsion.

4. The microelectromechanical gyroscope according to claim 1, wherein each central suspension arrangement comprises a gimbal structure which comprises an inner gimbal frame and a concentric outer gimbal frame, wherein the gimbal structure also comprises torsion bars which facilitate gimbal rotation about the lateral axis and the transversal axis.

5. The microelectromechanical gyroscope according to claim 4, wherein the inner gimbal frame is rectangular and the outer gimbal frame is rectangular, and the central suspension arrangement further comprises four substantially L-shaped frame elements connected in series which surround the outer gimbal frame, wherein the ends of each L-shaped frame element are connected to the ends of the adjacent L-shaped frame elements with hinge connection elements, wherein each hinge connection element allows the L-shaped frame elements which are connected to it to rotate in opposite directions about a vertical axis which crosses said hinge connection element, and the central suspension arrangement further comprises at least four connection bars, wherein each connection bar extends from the outer gimbal frame either to an adjacent L-shaped frame element or to an adjacent hinge connection element, and each proof mass in the corresponding proof mass quartet is attached to an adjacent hinge connection element with an attachment part.

6. The microelectromechanical gyroscope according to claim 1, wherein the gyroscope further comprises a first detection mass quartet within the first synchronization frame and a second detection mass quartet within the second synchronization frame, wherein the four detection masses which form the first detection mass quartet are in their rest positions symmetrically arranged around the first quartet center point, and the four detection masses which form the second detection mass quartet are in their rest position symmetrically arranged around the second quartet center point, wherein first and second detection masses in the first detection mass quartet are aligned on a first diagonal axis which crosses the lateral axis and the first transversal axis at the first quartet center point at an angle of 45 degrees, and third and fourth detection masses in the first detection mass quartet are aligned on a second diagonal axis which is orthogonal to the first diagonal axis and crosses the first quartet center point, wherein first and second detection masses in the second detection mass quartet are aligned on a third diagonal axis which crosses the lateral axis and the second transversal axis at the second quartet center point at an angle of 45 degrees, and third and fourth detection masses in the second detection mass quartet are aligned on a fourth diagonal axis which is orthogonal to the third diagonal axis and crosses the second quartet center point, wherein one or more transversal corner springs extend to each detection mass in the first detection mass quartet from an adjacent proof mass in the first proof mass quartet which is aligned on the lateral axis, and one or more lateral corner springs extend to each detection mass in the first detection mass quartet from an adjacent proof mass in the first proof mass quartet which is aligned on the first transversal axis, wherein one or more transversal corner springs extend to each detection mass in the second detection mass quartet from an adjacent proof mass in the second proof mass quartet which is aligned on the lateral axis, and one or more lateral corner springs extend to each detection mass in the second detection mass quartet from an adjacent proof mass in the second proof mass quartet which is aligned on the second transversal axis.

7. The microelectromechanical gyroscope according to claim 1, wherein the gyroscope comprises a first lateral anchor point and a second lateral anchor point on the lateral axis, so that the first lateral anchor point is adjacent to the first proof mass in the first proof mass quartet, and the second lateral anchor point is adjacent to the second proof mass in the second proof mass quartet, and the gyroscope further comprises a first transversal anchor point which lies on the third transversal axis on the first side of the lateral axis, and a second transversal anchor point which lies on the third transversal axis on the second side of the lateral axis, and the gyroscope further comprises a first lateral seesaw on the first side of the lateral axis and a second lateral seesaw on the second side of the lateral axis, wherein the first lateral seesaw is attached to the first transversal anchor point with a torsion element, and the second lateral seesaw is attached to the second transversal anchor point with a torsion element, wherein the first lateral seesaw is attached to the first synchronization frame with a torsion bar on the first transversal axis, and the first lateral seesaw is attached to the second synchronization frame with a torsion bar on the second transversal axis, and the second lateral seesaw is attached to the first synchronization frame with a torsion bar on the first transversal axis, and the second lateral seesaw is attached to the second synchronization frame with a torsion bar on the second transversal axis.

8. The microelectromechanical gyroscope according to claim 7, wherein the gyroscope further comprises a first transversal seesaw which is attached to the first lateral anchor point with a torsion element and a second transversal seesaw which is attached to the second lateral anchor point with a torsion element, and a first end of the first transversal seesaw is attached to a first end of the first lateral seesaw, and a second end of the first transversal seesaw is attached to a first end of the second lateral seesaw, and a first end of the second transversal seesaw is attached to a second end of the first lateral seesaw, and a second end of the second transversal seesaw is attached to a second end of the second lateral seesaw.

* * * * *